(12) United States Patent
Zhang et al.

(10) Patent No.: US 11,134,508 B2
(45) Date of Patent: Sep. 28, 2021

(54) METHOD AND DEVICE IN NODES USED FOR WIRELESS COMMUNICATION

(71) Applicants: XiaoBo Zhang, Shanghai (CN); Lin Yang, Shanghai (CN)

(72) Inventors: XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 123 days.

(21) Appl. No.: 16/680,523

(22) Filed: Nov. 12, 2019

(65) Prior Publication Data

US 2020/0154458 A1    May 14, 2020

(30) Foreign Application Priority Data

Nov. 12, 2018 (CN) .......................... 201811341933.1

(51) Int. Cl.
*H04W 72/12* (2009.01)
*H04W 72/10* (2009.01)
*H04W 4/40* (2018.01)
*H04L 5/00* (2006.01)
*H04W 76/27* (2018.01)

(52) U.S. Cl.
CPC ....... *H04W 72/1242* (2013.01); *H04L 5/0007* (2013.01); *H04W 4/40* (2018.02); *H04W 72/10* (2013.01); *H04W 72/1263* (2013.01); *H04W 72/1289* (2013.01); *H04W 76/27* (2018.02)

(58) Field of Classification Search
None
See application file for complete search history.

(56) References Cited

U.S. PATENT DOCUMENTS

| | | | | |
|---|---|---|---|---|
| 10,728,724 | B2* | 7/2020 | Chen | H04W 4/70 |
| 10,834,751 | B2* | 11/2020 | Yi | H04W 4/40 |
| 2003/0236854 | A1* | 12/2003 | Rom | H04L 47/822 |
| | | | | 709/217 |
| 2016/0080920 | A1* | 3/2016 | Baghel | H04W 4/90 |
| | | | | 455/404.1 |
| 2017/0064733 | A1* | 3/2017 | Lee | H04W 72/1278 |
| 2017/0230939 | A1* | 8/2017 | Rudolf | H04W 88/02 |
| 2017/0303291 | A1* | 10/2017 | Chae | H04W 72/12 |
| 2018/0220421 | A1* | 8/2018 | Zhang | H04W 72/10 |
| 2019/0174503 | A1* | 6/2019 | Adachi | H04W 72/121 |

(Continued)

*Primary Examiner* — Bunjob Jaroenchonwanit

(57) ABSTRACT

The present disclosure provides a method and a device in nodes for wireless communication. A first node receives first control information, the first control information being used for indicating a first radio resource group, and the first control information being used for indicating a first priority; chooses a target radio resource from a target resource pool; and transmits a first radio signal in the target radio resource; the first radio signal corresponds to a second priority; if the second priority is lower than the first priority, the target resource pool is orthogonal with the first radio resource group; if the second priority is higher than the first priority, the target resource pool overlaps with the first radio resource group. The method disclosure allows part of reserved resources to be released temporarily to meet abrupt business requirements, so as to achieve timely transmission of aperiodic and emergent business data.

20 Claims, 14 Drawing Sheets

(56) References Cited

U.S. PATENT DOCUMENTS

| | | | |
|---|---|---|---|
| 2020/0221398 A1* | 7/2020 | Ryu | H04W 52/367 |
| 2020/0351894 A1* | 11/2020 | Seo | H04W 74/0808 |
| 2021/0067267 A1* | 3/2021 | Chen | H04L 1/00 |
| 2021/0084656 A1* | 3/2021 | Feng | H04W 74/0816 |

* cited by examiner

METHOD AND DEVICE IN NODES USED FOR WIRELESS COMMUNICATION

CROSS-REFERENCE TO RELATED APPLICATION

This application claims the priority benefit of Chinese Patent Application Serial Number 201811341933.1, filed on Nov. 12, 2018, the full disclosure of which is incorporated herein by reference.

BACKGROUND

Technical Field

The present disclosure relates to transmission methods and devices in wireless communication systems, and in particular to a transmission scheme and a device in wireless communication relevant to sidelink, multi-antenna and wideband.

Related Art

Application scenarios of future wireless communication systems are becoming increasingly diversified, and different application scenarios have different performance demands on systems. In order to meet different performance requirements of various application scenarios, it was decided at the 3rd Generation Partner Project (3GPP) Radio Access Network (RAN #72 plenary session that a study on New Radio (NR), or what is called Fifth Generation (5G) shall be conducted. The work item of NR was approved at the 3GPP RAN #75 plenary session to standardize NR.

In response to rapidly growing Vehicle-to-Everything (V2X) services, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was approved.

SUMMARY

To fulfill the stringent service requirements of 5G, compared with conventional LTE V2X system, NR V2X system will be provided with higher throughput and reliability, lower latency, longer communication distance and more precise positioning, more various packet size and transmission periods, as well as other key techniques that can support coexistence of 3GPP and non-3GPP more efficiently. Currently, the LTE-V2X system is limited to broadcast communication, which means that the transmission modes and resource allocations in LTE-V2X are mainly applicable to long-term and periodic traffic; while NR-V2X, as an important field of the vertical industry, is supposed to support groupcast and unicast communications and also support bursty traffic flexibly.

To address the problem of supporting aperiodic bursty traffic with NR V2X, the present disclosure provides a solution for resource allocation. When a User Equipment (UE) reserves periodic resources through traditional sensing, it is able to release a part of the reserved resources in a flexible manner to meet the needs of bursty data for a dedicated user, thereby providing a more flexible resource allocating method, particularly in a scenario of Vehicles Platooning.

It should be noted that embodiments of a User Equipment (UE) in the present disclosure and characteristics of the embodiments may be applied to a base station, and vice versa. The embodiments in the present disclosure and the characteristics of the embodiments can be mutually combined if no conflict is incurred. Further, though originally targeted at single-carrier communication, the present disclosure is also applicable to multicarrier communication.

The present disclosure discloses a method in a first node used for wireless communication, comprising:
receiving first control information, the first control information being used for indicating a first radio resource group, and the first control information being used for indicating a first priority;
choosing a target radio resource from a target resource pool; and
transmitting a first radio signal in the target radio resource;
herein, the first radio signal corresponds to a second priority; if the second priority is lower than the first priority, the target resource pool is orthogonal with the first radio resource group; if the second priority is higher than the first priority, the target resource pool overlaps with the first radio resource group.

In one embodiment, a problem needed to be solved in the present disclosure is that an optimized resource configuration scheme targeting aperiodic emergent services shall be provided in NR V2X system.

In one embodiment, the above method is characterized in that a connection is created between a first priority and a second priority.

In one embodiment, the above method is characterized in that a connection is created between a first radio resource group and a target resource pool.

In one embodiment, an advantage of the above method is that when there is an emergent service requirement, a target UE releases part of reserved resources for a target user, so as to achieve the transmission of aperiodic and emergent service data and utilize radio resources more effectively.

According to one aspect of the present disclosure, the above method is characterized in comprising:
transmitting second control information;
herein, the second control information is used for indicating at least one of the target radio resource or a transmission format of the first radio signal.

According to one aspect of the present disclosure, the above method is characterized in comprising:
receiving third control information;
herein, the third control information is used for indicating a second radio resource group, the third control information comprises a first reference priority; the first reference priority is used for determining a first threshold, the first threshold is used for determining whether the second radio resource group can be occupied; the second radio resource group comprises the first radio resource group.

According to one aspect of the present disclosure, the above method is characterized in comprising:
monitoring the first control information;
herein, the first control information comprises a first identifier, the first identifier is used for determining a positive integer number of target receiver(s) of the first control information.

According to one aspect of the present disclosure, the above method is characterized in comprising:

transmitting fourth control information;

herein, the second priority is higher than the first priority, the target radio resource belongs to the first radio resource group, the fourth control information indicates at least one of the second priority or the target radio resource;

According to one aspect of the present disclosure, the above method is characterized in comprising:

detecting Q first-type signal(s) in a first time window, Q is a positive integer;

herein, a result of detection on the Q first-type signal(s) is used for determining the target resource pool; the target radio resource is determined autonomously from the target resource pool; a deadline of the first time window is no later than a start time of the target radio resource in time domain.

According to one aspect of the present disclosure, the above method is characterized in comprising:

receiving fifth control information;

herein, the fifth control information is used for indicating the target radio resource.

According to one aspect of the present disclosure, the above method is characterized in comprising:

receiving first configuration information;

herein, the first configuration information is used for determining a first candidate resource pool, the first candidate resource pool comprises the first radio resource group and the target resource pool, the first candidate resource pool comprises the first time window in time domain.

According to one aspect of the present disclosure, the above method is characterized in that the first node is a UE.

According to one aspect of the present disclosure, the above method is characterized in that the first node is a relay node.

The present disclosure discloses a method in a second node used for wireless communication, comprising:

transmitting first control information, the first control information being used for indicating a first radio resource group, and the first control information being used for indicating a first priority; and receiving a first radio signal in a target radio resource;

herein, the target radio resource belongs to a target resource pool; the first radio signal corresponds to a second priority; if the second priority is lower than the first priority, the target resource pool is orthogonal with the first radio resource group; if the second priority is higher than the first priority, the target resource pool overlaps with the first radio resource group.

According to one aspect of the present disclosure, the above method is characterized in comprising:

receiving second control information;

herein, the second control information is used for indicating at least one of the target radio resource or a transmission format of the first radio signal.

According to one aspect of the present disclosure, the above method is characterized in comprising:

transmitting third control information;

herein, the third control information is used for indicating a second radio resource group, the third control information comprises a first reference priority; the first reference priority is used for determining a first threshold, the first threshold is used for determining whether the second radio resource group can be occupied; the second radio resource group comprises the first radio resource group.

According to one aspect of the present disclosure, the above method is characterized in comprising:

receiving fourth control information;

herein, the second priority is higher than the first priority, the target radio resource belongs to the first radio resource group, the fourth control information indicates at least one of the second priority or the target radio resource.

According to one aspect of the present disclosure, the above method is characterized in comprising:

monitoring the fourth control information;

herein, if the fourth control information is not detected, transmitting a third radio signal in the first radio resource group.

According to one aspect of the present disclosure, the above method is characterized in comprising:

monitoring the fourth control information;

if the fourth control information is detected, not transmitting a third radio signal in the target radio resource, the target radio resource belonging to the first radio resource group.

According to one aspect of the present disclosure, the above method is characterized in comprising:

receiving second configuration information;

herein, the second configuration information is used for determining the first candidate resource pool, the first candidate resource pool comprises the first radio resource group and the target resource pool, the first candidate resource pool comprises the first time window in time domain.

According to one aspect of the present disclosure, the above method is characterized in that the second node is a base station.

According to one aspect of the present disclosure, the above method is characterized in that the second node is a relay node.

The present disclosure discloses a first node for wireless communication, comprising:

a first receiver, receiving first control information;

herein, the first receiver chooses a target radio resource from a target resource pool;

and a first transmitter, transmitting a first radio signal in the target radio resource;

herein, the first control information is used for indicating a first radio resource group, the first control information is used for indicating a first priority; the first radio signal corresponds to a second priority; if the second priority is lower than the first priority, the target resource pool is orthogonal with the first radio resource group; if the second priority is higher than the first priority, the target resource pool overlaps with the first radio resource group.

The present disclosure discloses a second node for wireless communication, comprising:

a second transmitter, transmitting first control information, and a second receiver, receiving a first radio signal in a target radio resource;

herein, the first control information is used for indicating a first radio resource group, the first control information is used for determining a first priority; the target radio resource belongs to a target resource pool; the first radio signal corresponds to a second priority; if the second priority is lower than the first priority, the target resource pool is orthogonal with the first radio resource group; if the second priority is higher than the first priority, the target resource pool overlaps with the first radio resource group.

In one embodiment, the present disclosure is advantageous in following aspects:

The present disclosure creates a connection between a first priority and a second priority.

The present disclosure creates a connection between a first radio resource group and a target resource pool.

In the present disclosure, when a target UE is presented with abrupt service requests, a part of reserved resources are released for the target user so as to satisfy transmission needs of aperiodic bust service data, hence the efficient utilization of radio resources.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

Figure 1:
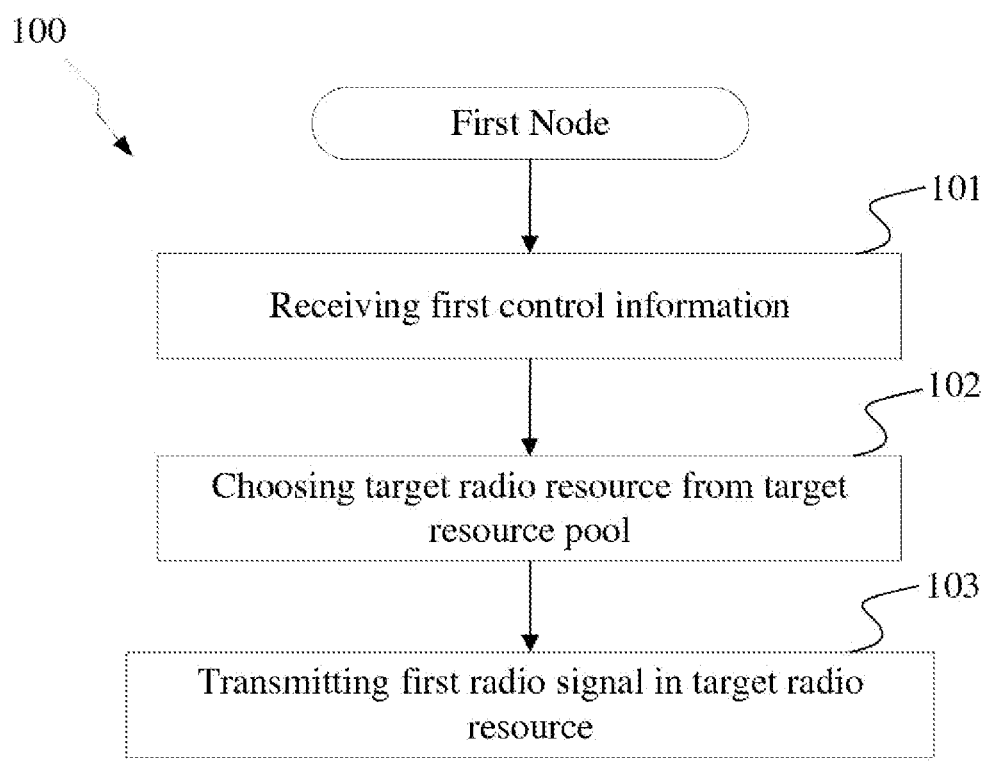
FIG. 1 illustrates a flowchart of transmission of first control information and a first radio signal according to one embodiment of the present disclosure.

The technical scheme of the present disclosure is described below in further details in conjunction with the drawings. It should be noted that the embodiments of the present disclosure and the characteristics of the embodiments may be arbitrarily combined if no conflict is caused.

The definitions specified hereinafter can be used for all embodiments and characteristics of embodiments in the present disclosure:

First-type channels include at least one of Broadcast Channel (BCH), Physical Broadcast Channel (PBCH), Physical Downlink Control Channel (PDCCH), Physical Downlink Shared Channel (PDSCH), Narrowband Physical Broadcast Channel (NPBCH), Narrowband Physical Downlink Control Channel (NPDCCH) or Narrowband Physical Downlink Shared Channel (NPDSCH).

Second-type channels include at least one of Physical Random Access Channel (PRACH), Physical Uplink Control Channel (PUCCH), Physical Uplink Shared Channel (PUSCH), Narrowband Physical Random Access Channel (NPRACH), Narrowband Physical Uplink Shared Channel (NPUSCH) or Short Physical Uplink Control Channel (SPUCCH).

Third-type channels include at least one of Sidelink Broadcast Channel (SL-BCH), Physical Sidelink Broadcast Channel (PSBCH), Physical Sidelink Discovery Channel (PSDCH), Physical Sidelink Control Channel (PSCCH) or Physical Sidelink Shared Channel (PSSCH).

First-type signals include at least one of Primary Synchronization Signal (PSS), Secondary Synchronization Signal (SSS), Synchronization Signal/Physical Broadcast Channel (SS/PBCH) block (SSB), Narrowband Primary Synchronization Signal (NPSS), Narrowband Secondary Synchronization Signal (NSSS), Reference Signal (RS), Channel State Information-Reference Signal (CSI-RS), Downlink Demodulation Reference Signal (DL DMRS), Discovery Signal (DS), Narrowband Reference Signal (NRS), Positioning Reference Signal (PRS), Narrowband Positioning Reference Signal (NPRS) or Phase-Tracking Reference Signal (PT-RS).

Second-type signals include at least one of Preamble, Uplink Demodulation Reference Signal (UL DMRS), Sounding Reference Signal (SRS) or Tracking Reference Signal (UL TRS).

Third-type signals include at least one of Sidelink Synchronization Signal (SLSS), Primary Sidelink Synchronization Signal (PSSS), Secondary Sidelink Synchronization Signal (SSSS), Sidelink Demodulation Reference Signal (SL DMRS) or PSBCH Demodulation Reference Signal (PSBCH-DMRS).

In one embodiment, the third-type signals include PSSS and SSSS.

In one embodiment, the third-type signals include PSSS, SSSS and PSBCH.

First pre-processes include at least one of primary scrambling, transport block(TB)-level Cyclic Redundancy Check (CRC) Attachment, Channel Coding, Rate Matching, secondary scrambling, Modulation, Layer Mapping, Transform Precoding, Precoding, Mapping to Physical Resources, Baseband Signal Generation, or Modulation and Upconversion.

In one embodiment, the first pre-processes are primary scrambling, TB-level Cyclic Redundancy Check (CRC) Attachment, Channel Coding, Rate Matching, secondary scrambling, Modulation, Layer Mapping, Transform Precoding, Precoding, Mapping to Physical Resources, Baseband Signal Generation, and Modulation and Upconversion in sequence.

Second pre-processes include at least one of transport block (TB)-level CRC Attachment, Code Block Segmentation, code block-level CRC Attachment, Channel Coding, Rate Matching, Code Block Concatenation, scrambling, modulation, Layer Mapping, Antenna Port Mapping, Mapping to Virtual Resource Blocks, Mapping from Virtual to Physical Resource Blocks, Baseband Signal Generation, or Modulation and Upconversion.

In one embodiment, second pre-processes are TB-level CRC Attachment, Code Block Segmentation, code block-level CRC Attachment, Channel Coding, Rate Matching, Code Block Concatenation, scrambling, modulation, Layer Mapping, Antenna Port Mapping, Mapping to Virtual Resource Blocks, Mapping from Virtual to Physical Resource Blocks, Baseband Signal Generation, and Modulation and Upconversion in sequence.

In one embodiment, the channel coding is based on a polar code.

In one embodiment, the channel coding is based on a Low-density Parity-Check (LDPC) code.

Embodiment 1

Embodiment 1 illustrates a flowchart of transmission of first control information and a first radio signal, as shown in FIG. 1. In FIG. 1, each box represents a step.

In Embodiment 1, the first node in the present disclosure first receives first control information; and chooses a target radio resource from a target resource pool; and then transmits a first radio signal in the target radio resource; the first control information is used for indicating a first radio resource group, and the first control information is used for indicating a first priority; the first radio signal corresponds to a second priority; if the second priority is lower than the first priority, the target resource pool is orthogonal with the first radio resource group; if the second priority is higher than the first priority, the target resource pool overlaps with the first radio resource group.

In one embodiment, the first radio resource group belongs to the third-type channels in the present disclosure.

In one the first radio resource group comprises the third-type channels in the present disclosure.

In one embodiment, the first radio resource group belongs to the second-type channels in the present disclosure.

In one the first radio resource group comprises the second-type channels in the present disclosure.

In one embodiment, the first radio resource group comprises X1 time domain units; X1 is a positive integer.

In one embodiment, the first radio resource group comprises Y1 frequency domain units; Y1 is a positive integer.

In one embodiment, the first radio resource group comprises Z1 time-frequency resource units; Z1 is a positive integer.

In one embodiment, the first radio resource group is reserved by the transmitter of the first control information.

In one embodiment, the transmitter of the first control information does not transmit any radio signal in the first radio resource group.

In one embodiment, the first radio resource group is reserved by the transmitter of the first control information, wherein the transmitter of the first control information does not transmit any radio signal in the first radio resource group.

In one embodiment, the first control information is transmitted through a radio signal.

In one embodiment, the first control information is transmitted via a PC5 interface.

In one embodiment, the first control information is transmitted through the third-type channel in the present disclosure.

In one embodiment, the first control information is transmitted through the second-type channel in the present disclosure.

In one embodiment, the first control information is transmitted via broadcast.

In one embodiment, the first control information is transmitted via groupcast.

In one embodiment, the first control information is transmitted via unicast.

In one embodiment, the first control information is cell-specific.

In one embodiment, the first control information is UE-specific.

In one embodiment, the first control information comprises all or part of a higher layer signaling.

In one embodiment, the first control information comprises all or part of a Radio Resource Control (RRC) signaling.

In one embodiment, the first control information comprises one or a plurality of fields of an RRC Information Element (IE).

In one embodiment, the first control information comprises one or a plurality of fields of a System Information Block (SIB).

In one embodiment, the first control information comprises one or a plurality of fields of a piece of Remaining Minimum System Information (RMSI).

In one embodiment, the first control information comprises one or a plurality of fields of a piece of Other System Information (OSI).

In one embodiment, the first control information comprises all or part of a Multimedia Access Control (MAC) layer signaling.

In one embodiment, the first control information comprises one or a plurality of fields of a MAC Control Element (CE).

In one embodiment, the first control information comprises one or a plurality of fields of a physical (PHY) layer signaling.

In one embodiment, the first control information comprises one or a plurality of fields of a piece of Sidelink Control Information (SCI).

In one embodiment, the first control information comprises one or a plurality of fields of an SCI format.

In one embodiment, the first control information comprises one or a plurality of fields of a piece of Uplink Control Information (UCI).

In one embodiment, the specific meaning of the SCI format can be found in 3GPP TS36.212, section 5.4.3.

In one embodiment, the first control information is semi-statically configured.

In one embodiment, the first control information is dynamically configured.

In one embodiment, the first control information explicitly indicates the first radio resource group.

In one embodiment, the first control information implicitly indicates the first radio resource group.

In one embodiment, the first control information indicates all time domain units comprised by the first radio resource group.

In one embodiment, the first control information indicates a first time domain unit of the X1 time domain units comprised in the first radio resource group.

In one embodiment, the first control information indicates a last time domain unit of the X1 time domain units comprised in the first radio resource group.

In one embodiment, the first control information indicates an earliest time domain unit of the X1 time domain units comprised in the first radio resource group.

In one embodiment, the first control information indicates a latest time domain unit of the X1 time domain units comprised in the first radio resource group.

In one embodiment, the first control information indicates a first time domain unit of the X1 time domain units comprised in the first radio resource group and a time interval of the X1 time domain units.

In one embodiment, the first control information indicates all frequency domain units comprised by the first radio resource group.

In one embodiment, the first control information indicates a first frequency domain unit of the Y1 frequency domain units comprised in the first radio resource group.

In one embodiment, the first control information indicates a last frequency domain unit of the Y1 frequency domain units comprised in the first radio resource group.

In one embodiment, the first control information indicates a lowest frequency domain unit of the Y1 frequency domain units comprised in the first radio resource group.

In one embodiment, the first control information indicates a highest frequency domain unit of the Y1 frequency domain units comprised in the first radio resource group.

In one embodiment, the first control information indicates a first frequency domain unit of the Y1 frequency domain units comprised in the first radio resource group and a frequency interval of the Y1 frequency domain units.

In one embodiment, the first control information comprises all time-frequency resource units comprised by the first radio resource group.

In one embodiment, the first control information is used for indicating the first radio resource group out of a second radio resource group of the present disclosure.

In one embodiment, the first control information is used for indicating the first radio resource group out of a first candidate resource pool of the present disclosure.

In one embodiment, the first control information comprises an index of the first radio resource group in the first candidate resource pool.

In one embodiment, the first control information comprises an index of the first radio resource group in the second radio resource group.

In one embodiment, the first control information comprises an index of a first time domain unit of the X1 time domain units comprised by the first radio resource group in the second radio resource group.

In one embodiment, the first control information comprises an index of a first time domain unit of the X1 time domain units comprised by the first radio resource group in the first candidate resource pool.

In one embodiment, the first control information comprises an index of a first time domain unit of the X1 time domain units comprised by the first radio resource group in the second radio resource group and a time interval of the X1 time domain units.

In one embodiment, the first control information comprises an index of a first time domain unit of the X1 time domain units comprised by the first radio resource group in the first candidate resource pool and a time interval of the X1 time domain units.

In one embodiment, the first control information comprises a time offset between a first time domain unit of the first radio resource group and a first time domain unit of the first candidate resource pool.

In one embodiment, the first control information comprises a time offset between a first time domain unit of the first radio resource group and a first time domain unit of the second radio resource group.

In one embodiment, the first control information comprises a frequency offset between a first frequency domain unit of the first radio resource group and a first frequency domain unit of the first candidate resource pool.

In one embodiment, the first control information comprises a frequency offset between a first frequency domain unit of the first radio resource group and a first frequency domain unit of the second radio resource group.

In one embodiment, the first control information comprises B1 bits, the B1 bits comprised by the first control information respectively correspond to X2 time domain units comprised by the second radio resource group, B1 and X2 are both positive integers, the B1 is equal to the X2.

In one embodiment, a first given bit is one of the B1 bits comprised by the first control information, a first given time domain unit is one of the X2 time domain units comprised by the second radio resource group corresponding to the first given bit, the first given bit is 1, and the first given time domain unit belongs to the first radio resource group.

In one embodiment, the first control information comprises B2 bits, the B2 bits comprised by the first control information respectively correspond to Y2 frequency domain units comprised by the second radio resource group, B2 and Y2 are both positive integers, the B2 is equal to the Y2.

In one embodiment, a second given bit is one of the B2 bits comprised by the first control information, a first given frequency domain unit is one of the Y2 frequency domain units comprised by the second radio resource group corresponding to the second given bit, the second given bit is 1, and the first given frequency domain unit belongs to the first radio resource group.

In one embodiment, the first control information comprises UL/DL subframe configurations.

In one embodiment, the specific meaning of the UL/DL subframe configurations can be found in 3GPP TS36.211, section 4.2 and table 4.2-2.

In one embodiment, the first control information comprises UL/DL slot configurations.

In one embodiment, the first control information comprises UL/DL symbol configurations.

In one embodiment, the first control information indicates slot formats.

In one embodiment, the specific meaning of the slot formats can be found in 3GPP TS38.213, section 11.1.1 and table 11.1.1-1.

In one embodiment, the first control information comprises a Radio Frame Number of a radio frame corresponding to one of the X1 time domain units comprised by the first radio resource group.

In one embodiment, the first control information comprises a Subframe Number of a subframe corresponding to one of the X1 time domain units comprised by the first radio resource group.

In one embodiment, the first control information comprises a Slot Number of a slot corresponding to one of the X1 time domain units comprised by the first radio resource group.

In one embodiment, the first control information comprises a Carrier Number of a carrier corresponding to one of the Y1 frequency domain units comprised by the first radio resource group.

In one embodiment, the first control information comprises a Bandwidth Part (BWP) Number of a BWP corresponding to one of the Y1 frequency domain units comprised by the first radio resource group.

In one embodiment, the first control information comprises a Resource Block (RB) Number of an RB corresponding to one of the Y1 frequency domain units comprised by the first radio resource group.

In one embodiment, the first control information comprises a Physical Resource Block (PRB) Number of a PRB corresponding to one of the Y1 frequency domain units comprised by the first radio resource group.

In one embodiment, the first control information comprises a minimum index of indices of a positive integer number of sub-channels comprised in one of the Y1 frequency domain units comprised in the first radio resource group in frequency domain.

In one embodiment, the first control information comprises a minimum index of indices of a positive integer number of PRBs comprised in one of the Y1 frequency domain units comprised by the first radio resource group in frequency domain.

In one embodiment, the first control information indicates a number of sub-channels comprised in one of the Y1 frequency domain units comprised by the first radio resource group in frequency domain.

In one embodiment, the first control information comprises an index of a smallest PRB of one of the Y1 frequency domain units comprised by the first radio resource group in frequency domain.

In one embodiment, the first control information indicates a number of PRBs comprised in one of the Y1 frequency domain units comprised by the first radio resource group in frequency domain.

In one embodiment, the first control information indicates a center frequency and bandwidth corresponding to one of the Y1 frequency domain units comprised by the first radio resource group in frequency domain.

In one embodiment, the center frequency is an Absolute Radio Frequency Channel Number (AFCN).

In one embodiment, the center frequency is a positive integral multiple of 100 kHz.

In one embodiment, the first control information indicates a lowest frequency and a highest frequency of the first radio resource group in frequency domain.

In one embodiment, the first control information indicates a lowest frequency and bandwidth of the first radio resource group in occupying frequency domain resources.

In one embodiment, the first control information indicates an earliest time of time domain resources corresponding to the first radio resource group.

In one embodiment, the first control information indicates a latest time of time domain resources corresponding to the first radio resource group.

In one embodiment, the first control information indicates an earliest time of time domain resources corresponding to the first radio resource group and time length.

In one embodiment, a first priority list comprises a positive integer number of first-type priorities, wherein the first priority is one of the positive integer number of first-type priorities.

In one embodiment, the first priority corresponds to the importance of services carried by radio signals.

In one embodiment, the first priority corresponds to the latency requirement of service carried by radio signals.

In one embodiment, a second threshold list comprises a positive integer number of second-type thresholds, wherein the first priority is one of the positive integer number of second-type thresholds.

In one embodiment, any of the positive integer number of second-type thresholds is a power value.

In one embodiment, any of the positive integer number of second-type thresholds is an energy value.

In one embodiment, any of the positive integer number of second-type thresholds is an additional power value.

In one embodiment, any of the positive integer number of second-type thresholds is an additional energy value.

In one embodiment, the first priority is used for identifying the first node.

In one embodiment, the first priority comprises an identity (ID) of the first node.

In one embodiment, the first priority comprises a Radio Network Temporary Identifier (RNTI) of the first node.

In one embodiment, the first priority comprises a Cell-RNTI (C-RNTI) of the first node.

In one embodiment, the first control information explicitly indicated the first priority.

In one embodiment, the first control information implicitly indicated the first priority.

In one embodiment, the first control information indicates an index of the first priority in the first priority list.

In one embodiment, the first control information indicates an index of the first priority in the first threshold list.

In one embodiment, a first control signaling comprises the first control information.

In one embodiment, the first control signaling is generated after the first control information is subjected to the first pre-processes in the present disclosure.

In one embodiment, the first control signaling is generated after the first control information is subjected to the second pre-processes in the present disclosure.

In one embodiment, the first control signaling comprises the third-type signals.

In one embodiment, the first control signaling is transmitted on the third-type channels.

In one embodiment, the first priority is used for scrambling the first control signaling.

In one embodiment, the first priority is used for generating the CRC of the first control signaling.

In one embodiment, the first priority is used for determining a demodulation reference signal of the first control signaling.

In one embodiment, a subcarrier spacing of subcarriers occupied by the first control signaling in frequency domain is one of 15 kHz, 30 kHz, 60 kHz, 120 kHz, 240 kHz, 480 kHz and 960 kHz.

In one embodiment, a number of multicarrier symbols comprised by the first control signaling in time domain is one of 1, 2, 3, 4, 5, 6, 7, 11, 12, 13 and 14.

In one embodiment, the first radio signal includes the second-type signal in the present disclosure.

In one embodiment, the first radio signal includes the third-type signal in the present disclosure.

In one embodiment, the first radio signal is transmitted on the second-type channels in the present disclosure.

In one embodiment, the first radio signal is transmitted on the third-type channels in the present disclosure.

In one embodiment, the first radio signal is cell-specific.

In one embodiment, the first radio signal is UE-specific.

In one embodiment, the first radio signal is transmitted via broadcast.

In one embodiment, the first radio signal is transmitted via groupcast.

In one embodiment, the first radio signal is transmitted via unicast.

In one embodiment, the first radio signal comprises all or part of a higher layer signaling.

In one embodiment, the first radio signal comprises all or part of an RRC layer signaling.

In one embodiment, the first radio signal comprises one or a plurality of fields of an RRC IE.

In one embodiment, the first radio signal comprises all or part of a MAC layer signaling.

In one embodiment, the first radio signal comprises one or a plurality of fields of a MAC CE.

In one embodiment, the first radio signal comprises one or a plurality of fields of a PHY layer.

In one embodiment, the first radio signal comprises one or a plurality of fields of a piece of SCI.

In one embodiment, the first radio signal comprises one or a plurality of fields of a piece of UCI.

In one embodiment, the first radio signal comprises one or a plurality of fields of a Master Information Block (MIB).

In one embodiment, the first radio signal comprises one or a plurality of fields of a MIB-SL.

In one embodiment, the first radio signal comprises one or a plurality of fields of a MIB-V2X-SL.

In one embodiment, the first radio signal comprises one or a plurality of fields of a SIB.

In one embodiment, the first radio signal comprises one or a plurality of fields of an RMSI.

In one embodiment, the first radio signal comprises one or a plurality of fields of an OSI.

In one embodiment, the first radio signal comprises one or a plurality of fields of an SCI format.

In one embodiment, the first radio signal comprises a first bit block, the first bit block comprises a positive integer number of sequentially arranged bits.

In one embodiment, the first bit block comprises a Code Block (CB).

In one embodiment, the first bit block comprises a Code Block Group (CBG).

In one embodiment, the first bit block comprises a Transport Block (TB).

In one embodiment, the first bit block is generated after a TB is subjected to TB-level CRC attachment.

In one embodiment, the first bit block is a CB of a code block acquired after a TB is sequentially subjected to TB-level CRC attachment, code block segmentation, and code block-level CRC attachment.

In one embodiment, the first radio signal is obtained after all or part of bits in the first bit block is subjected to the first pre-processes in the present disclosure.

In one embodiment, the first radio signal is obtained after all or part of bits in the first bit block is subjected to the second pre-processes in the present disclosure.

In one embodiment, the first radio signal is an output after all or part of bits in the first bit block is subjected to the first pre-processes in the present disclosure.

In one embodiment, the first radio signal is an output after all or part of bits in the first bit block is subjected to the second pre-processes in the present disclosure.

In one embodiment, only the first bit block is used for generating the first radio signal.

In one embodiment, a code block other than the first bit block is used for generating the first radio signal.

In one embodiment, the first radio signal does not comprise SCI.

In one embodiment, the first radio signal does not comprise UCI.

In one embodiment, a subcarrier spacing of subcarriers occupied by the first radio signal in frequency domain is one of 15 kHz, 30 kHz, 60 kHz, 120 kHz, 240 kHz, 480 kHz and 960 kHz.

In one embodiment, a number of multicarrier symbols comprised by the first radio signal in time domain is one of 1, 2, 3, 4, 5, 6, 7, 11, 12, 13, and 14.

In one embodiment, a second priority list comprises a positive integer number of second-type priorities, the second priority is one of the positive integer number of second-type priorities.

In one embodiment, the second priority corresponds to the importance of services carried by radio signals.

In one embodiment, the second priority corresponds to the latency requirement of service carried by radio signals.

In one embodiment, the second priority list is the same as the first priority list.

In one embodiment, the positive integer number of second-type priorities respectively correspond to the positive integer number of first-type priorities.

In one embodiment, a third threshold list comprises a positive integer number of third-type thresholds, the second priority is one of the positive integer number of third-type thresholds.

In one embodiment, any of the positive integer number of third-type thresholds is a power value.

In one embodiment, any of the positive integer number of third-type thresholds is an energy value.

In one embodiment, any of the positive integer number of third-type thresholds is an additional power value.

In one embodiment, any of the positive integer number of third-type thresholds is an additional energy value.

In one embodiment, the third threshold list is the same as the second threshold list.

In one embodiment, the second priority is used for identifying the first node.

In one embodiment, the second priority comprises an ID of the first node.

In one embodiment, the second priority comprises an RNTI of the first node.

In one embodiment, the second priority comprises a C-RNTI of the first node.

In one embodiment, the second priority is configured by a higher layer of the first node.

In one embodiment, the second priority is configured by the network of a cell to which the first node belongs.

In one embodiment, the target resource pool belongs to the third-type channels in the present disclosure.

In one embodiment, the target resource pool comprises the third-type channels in the present disclosure.

In one embodiment, the target resource pool belongs to the second-type channels in the present disclosure.

In one embodiment, the target resource pool comprises the second-type channels in the present disclosure.

In one embodiment, the target resource pool comprises X4 time domain units; X4 is a positive integer.

In one embodiment, the target resource pool comprises Y4 frequency domain units; Y4 is a positive integer.

In one embodiment, the target resource pool comprises Z4 time-frequency resource units; Z4 is a positive integer.

In one embodiment, the target resource pool is configured by a higher layer of the first node.

In one embodiment, the target resource pool is configured by the network of a cell to which the first node belongs.

In one embodiment, the target resource pool is acquired by the first node through a first-type monitoring.

In one embodiment, the target resource pool is acquired by the first node through a second-type monitoring.

In one embodiment, the target radio resource belongs to the third-type channels in the present disclosure.

In one embodiment, the target radio resource comprises the third-type channels in the present disclosure.

In one embodiment, the target radio resource belongs to the second-type channels in the present disclosure.

In one embodiment, the target radio resource comprises the second-type channels in the present disclosure.

In one embodiment, the target radio resource comprises X5 time domain units; X5 is a positive integer.

In one embodiment, the target radio resource comprises Y5 frequency domain units; Y5 is a positive integer.

In one embodiment, the target radio resource comprises Z5 time-frequency resource units; Z5 is a positive integer.

In one embodiment, the X4 time domain units comprised in the target resource pool include the X5 time domain units comprised in the target radio resource; the X4 is not less than the X5.

In one embodiment, the Y4 frequency domain units comprised in the target resource pool include the Y5 frequency domain units comprised in the target radio resource; the Y4 is not less than the Y5.

In one embodiment, the Z4 time-frequency resource units comprised in the target resource pool include the Z5 time-frequency resource units comprised in the target radio resource; the Z4 is not less than the Z5.

In one embodiment, the first node chooses the target radio resource from the target resource pool.

In one embodiment, X5 time domain units with best channel quality out of the X4 time domain units comprised by the target resource pool are chosen as the target radio resource.

In one embodiment, earliest X5 time domain units out of the X4 time domain units comprised by the target resource pool are chosen as the target radio resource.

In one embodiment, Y5 frequency domain units with best channel quality out of the Y4 frequency domain units comprised by the target resource pool are chosen as the target radio resource.

In one embodiment, Y5 frequency domain units with lowest frequency out of the Y4 frequency domain units comprised by the target resource pool are chosen as the target radio resource.

In one embodiment, Z5 time-frequency resource units with best channel quality out of the Z4 time-frequency resource units comprised by the target resource pool are chosen as the target radio resource.

In one embodiment, the channel quality includes Reference Signal Receiving Power (RSRP).

In one embodiment, the channel quality includes RSRP of a PSSCH.

In one embodiment, the channel quality includes a Received Signal Strength Indicator (RSSI).

In one embodiment, RSRP values of the X5 time domain units comprised by the target radio resource are lower than RSRP value of each time domain unit other than the target radio resource out of the target resource pool.

In one embodiment, RSRP values of the Y5 frequency domain units comprised by the target radio resource are lower than RSRP value of each frequency domain unit other than the target radio resource out of the target resource pool.

In one embodiment, RSRP values of the Z5 time-frequency resource units comprised by the target radio resource are lower than RSRP value of each time-frequency resource unit other than the target radio resource out of the target resource pool.

In one embodiment, the X5 time domain units comprised by the target radio resource are earliest time domain units of the target resource pool.

In one embodiment, the X5 time domain units comprised by the target radio resource are earlier than all time domain units other than the target radio resource out of the target resource pool.

In one embodiment, the Y5 frequency domain units comprised by the target radio resource are lowest frequency domain units of the target resource pool.

In one embodiment, the Y5 frequency domain units comprised by the target radio resource are lower than all frequency domain units other than the target radio resource out of the target resource pool.

In one embodiment, the Z5 time-frequency resource units comprised by the target radio resource are time-frequency resource units with smallest indices out of the target resource pool.

In one embodiment, the Z5 time-frequency resource units comprised by the target radio resource have smaller indices than all time-frequency resource units other than the target radio resource out of the target resource pool.

In one embodiment, the fifth control information in the present disclosure is used for indicating the target radio resource out of the target resource pool.

In one embodiment, the PHY layer of the first node receives a higher signaling from the first node, wherein the higher layer signaling indicates the target radio resource out of the target resource pool.

In one subembodiment, a higher layer signaling from the first node is a Buffer Status Report (BSR).

Embodiment 2

Figure 2:
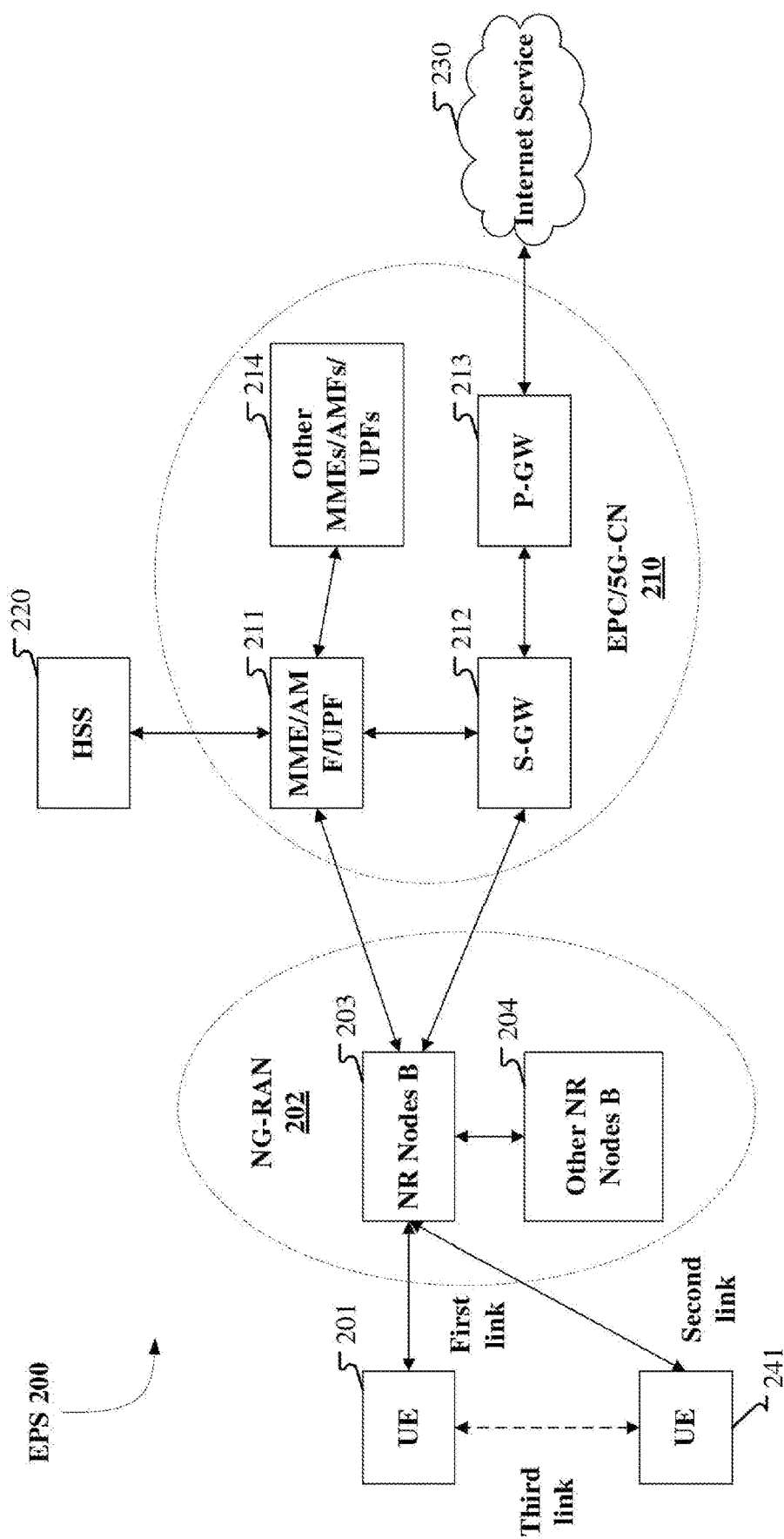
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or other applicable terminology. The EPS 200 may comprise one or a plurality of UEs 201, an NG-RAN 202, a Network Evolved Packet Core/5G-Core (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure includes the UE 201.

In one embodiment, the first node in the present disclosure includes the UE 241.

In one embodiment, the second node in the present disclosure includes the UE 201.

In one embodiment, the second node in the present disclosure includes the UE 241.

In one embodiment, the UE in the present disclosure includes the UE 201.

In one embodiment, the UE in the present disclosure includes the UE 241.

In one embodiment, the UE 201 supports sidelink transmission.

In one embodiment, the UE 241 supports sidelink transmission.

In one embodiment, the UE 201 supports a PC5 interface.
In one embodiment, the UE 241 supports a PC5 interface.
In one embodiment, the UE 201 supports a Uu interface.
In one embodiment, the UE 241 supports a Uu interface.
In one embodiment, the UE 201 supports V2X service.
In one embodiment, the UE 241 supports V2X service.
In one embodiment, the gNB 203 supports a Uu interface.
In one embodiment, the gNB 203 supports V2X service.
In one embodiment, a transmitter of the first configuration information in the present disclosure includes the gNB 203.

In one embodiment, a transmitter of the second configuration information in the present disclosure includes the gNB 203.

In one embodiment, a transmitter of the fifth control information in the present disclosure includes the gNB 203.

In one embodiment, a receiver of the first control information in the present disclosure includes the UE 201.

In one embodiment, transmitters of the second control information in the present disclosure include the UE 201.

In one embodiment, a receiver of the third control information in the present disclosure includes the UE 201.

In one embodiment, a transmitter of the fourth control information in the present disclosure includes the UE 201.

In one embodiment, a transmitter of the first radio signal in the present disclosure includes the UE 201.

In one embodiment, a receiver of Q first-type signal(s) in the present disclosure includes the UE 201.

In one embodiment, a receiver of the fifth control information in the present disclosure includes the UE 201.

In one embodiment, a receiver of the first configuration information in the present disclosure includes the UE 201.

In one embodiment, a transmitter of the first control information in the present disclosure includes the UE 241.

In one embodiment, a receiver of the second control information in the present disclosure includes the UE 241.

In one embodiment, a transmitter of the third control information in the present disclosure includes the UE 241.

In one embodiment, a receiver of the fourth control information in the present disclosure includes the UE 241.

In one embodiment, a receiver of the first radio signal in the present disclosure includes the UE 241.

In one embodiment, a transmitter of the Q first-type signal(s) in the present disclosure includes the UE 241.

In one embodiment, a receiver of the second configuration information in the present disclosure includes the UE 241.

In one embodiment, a receiver of the first control information in the present disclosure includes the UE 241.

In one embodiment, a transmitter of the second control information in the present disclosure includes the UE 241.

In one embodiment, a receiver of the third control information in the present disclosure includes the UE 241.

In one embodiment, a transmitter of the fourth control information in the present disclosure includes the UE 241.

In one embodiment, a transmitter of the first radio signal in the present disclosure includes the UE 241.

In one embodiment, a receiver of the Q first-type signal(s) in the present disclosure includes the UE 241.

In one embodiment, a receiver of the fifth control information in the present disclosure includes the UE 241.

In one embodiment, a receiver of the first configuration information in the present disclosure includes the UE 241.

In one embodiment, a transmitter of the first control information in the present disclosure includes the UE 201.

In one embodiment, a receiver of the second control information in the present disclosure includes the UE 201.

In one embodiment, a transmitter of the third control information in the present disclosure includes the UE 201.

In one embodiment, a receiver of the fourth control information in the present disclosure includes the UE 201.

In one embodiment, a transmitter of the Q first-type signal(s) in the present disclosure includes the UE 201.

In one embodiment, a receiver of the second configuration information in the present disclosure includes the UE 201.

Embodiment 3

Figure 3:
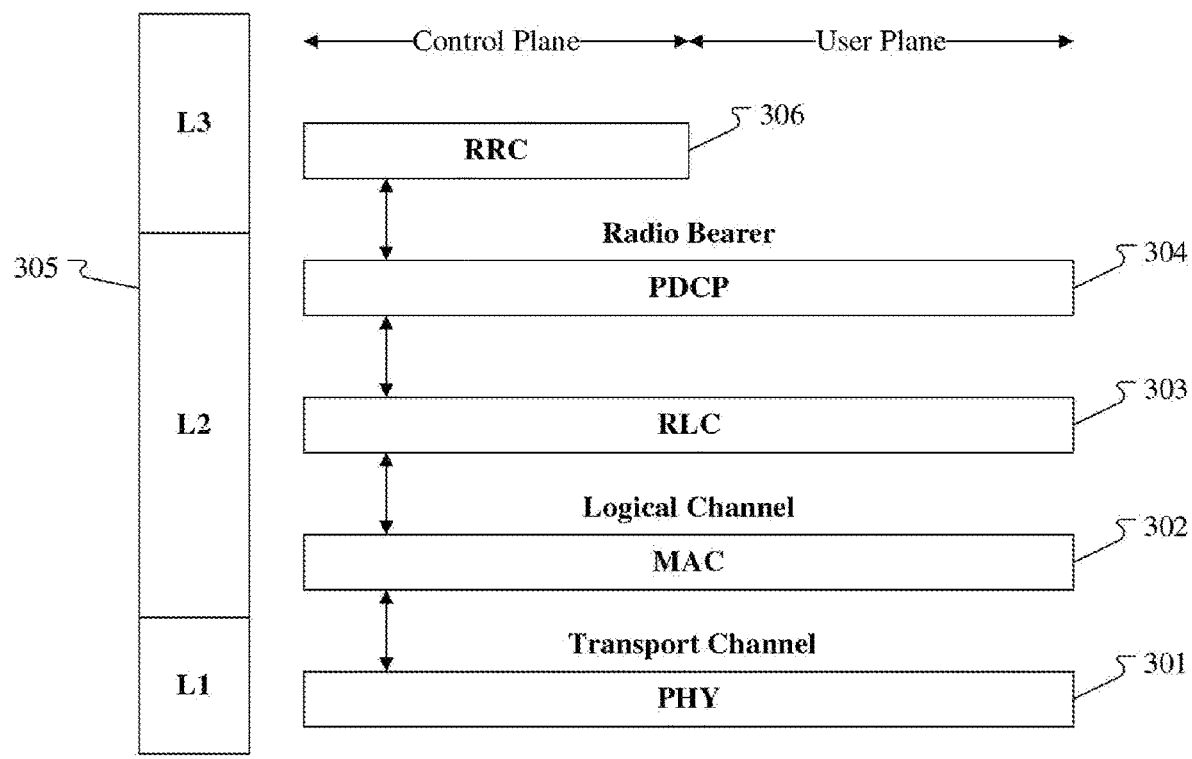
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to the present disclosure, as shown in FIG. 3.

FIG. 3 is a schematic diagram illustrating an embodiment of a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. Layers above the L1 are higher layers. The L1 is called PHY 301 in the present disclosure. The layer 2 (L2) 305 is above the PHY 301, and is in charge of the link between the UE and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the base stations of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between base stations. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource block) in a cell. The MAC sublayer 302 is also in charge of HARQ operation. In the control plane, the radio protocol architecture of the UE and the base station is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first control information in the present disclosure is generated by the PHY 301.

In one embodiment, the first control information in the present disclosure is generated by the MAC sublayer 302.

In one embodiment, the first control information in the present disclosure is transferred from the L2 layer to the PHY 301.

In one embodiment, the first radio signal in the present disclosure is generated by the PHY 301.

In one embodiment, the first radio signal in the present disclosure is generated by the RRC sublayer 306.

In one embodiment, the second control information in the present disclosure is generated by the PHY 301.

In one embodiment, the second control information in the present disclosure is generated by the MAC sublayer 302.

In one embodiment, the second control information in the present disclosure is transferred from the L2 layer to the PHY 301.

In one embodiment, the third control information in the present disclosure is generated by the PHY 301.

In one embodiment, the third control information in the present disclosure is generated by the MAC sublayer 302.

In one embodiment, the third control information in the present disclosure is transferred from the L2 layer to the PHY 301.

In one embodiment, the fourth control information in the present disclosure is generated by the PHY 301.

In one embodiment, the fourth control information in the present disclosure is generated by the MAC sublayer 302.

In one embodiment, the fourth control information in the present disclosure is transferred from the L2 layer to the PHY 301.

In one embodiment, the Q first-type signal(s) in the present disclosure is(are) generated by the PHY 301.

In one embodiment, the fifth control information in the present disclosure is generated by the PHY 301.

In one embodiment, the fifth control information in the present disclosure is generated by the MAC sublayer 302.

In one embodiment, the fifth control information in the present disclosure is transferred from the L2 layer to the PHY 301.

In one embodiment, the first configuration information in the present disclosure is generated by the RRC sublayer 306.

In one embodiment, the second configuration information in the present disclosure is generated by the RRC sublayer 306.

Embodiment 4

Figure 4:
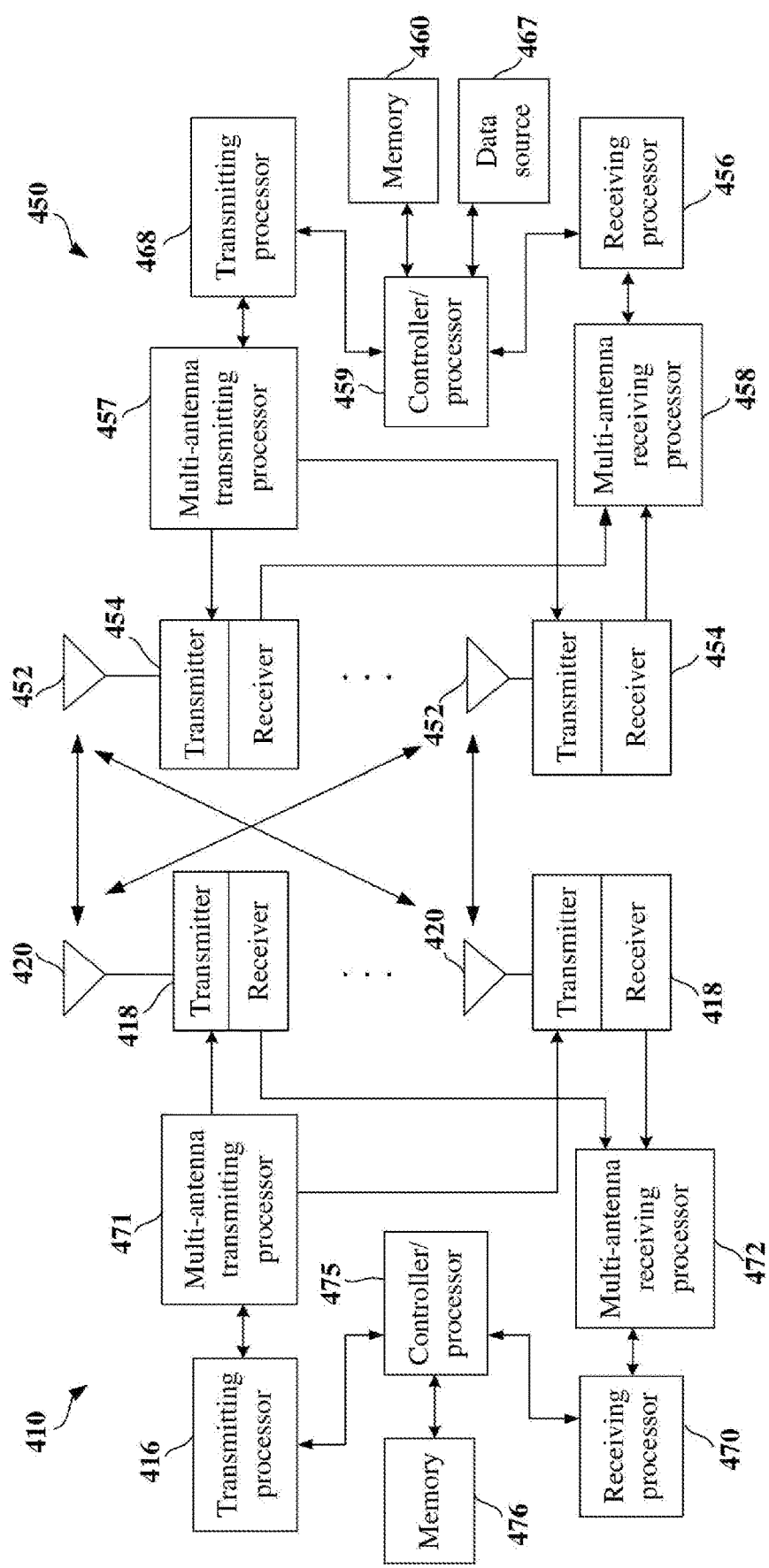
FIG. 4 illustrates a schematic diagram of first node and a second node according to one embodiment of the present disclosure.

Embodiment 4 illustrates a schematic diagram of a first communication device (first node) and a second communication device (second node) according to the present disclosure, as shown in FIG. 4. FIG. 4 is a block diagram of a first communication device 410 and a second communication device in communication with each other in an access network.

The first communication device 410 comprises a controller/processor 475, a memory 476, a receiving processor 470, a transmitting processor 416, a multi-antenna receiving processor 472, a multi-antenna transmitting processor 471 a transmitter/receiver 418 and an antenna 420.

The second communication device 420 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication node 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or a plurality of spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In a transmission between the first communication device 410 and the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be connected to the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network.

In one embodiment, the first node of the present disclosure comprises the second communication device 450, while the second node of the present disclosure comprises the first communication device 410.

In one subembodiment of the above embodiment, the first node is a UE, and the second node is a base station.

In one subembodiment of the above embodiment, the first node is a UE, and the second node is a relay node.

In one subembodiment of the above embodiment, the first node is a relay node, and the second node is a base station.

In one subembodiment of the above embodiment, the first communication device 450 comprises at least one controller/processor; the at least one controller/processor is in charge of HARQ operation.

In one subembodiment of the above embodiment, the second communication device 410 comprises at least one controller/processor; the at least one controller/processor is in charge of error detection using ACK and/or NACK protocols to support HARQ operation.

In one embodiment, the second communication device 450 comprises at least one processor and at least one memory. The at least one memory includes computer program codes. The at least one memory and the computer program codes are configured to be used in collaboration with the at least one processor. The second communication device 450 at least receives first control information, the first control information being used for indicating a first radio resource group, and the first control information being used for indicating a first priority; chooses a target radio resource from a target resource pool; and transmits a first radio signal in the target radio resource; the first radio signal corresponds to a second priority; if the second priority is lower than the first priority, the target resource pool is orthogonal with the first radio resource group; if the second priority is higher than the first priority, the target resource pool overlaps with the first radio resource group.

In one embodiment, the second communication device 450 comprises a memory that stores a computer readable instruction program. The computer readable instruction program generates an action when executed by at least one processor. The action includes: receiving first control information, the first control information being used for indicating a first radio resource group, and the first control information being used for indicating a first priority; choosing a target radio resource from a target resource pool; and transmitting a first radio signal in the target radio resource; the first radio signal corresponds to a second priority; if the second priority is lower than the first priority, the target resource pool is orthogonal with the first radio resource group; if the second priority is higher than the first priority, the target resource pool overlaps with the first radio resource group.

In one embodiment, the first communication device 410 comprises at least one processor and at least one memory. The at least one memory includes computer program codes. The at least one memory and the computer program codes are configured to be used in collaboration with the at least one processor. The first communication device 410 at least transmits first control information, the first control information being used for indicating a first radio resource group, and the first control information being used for indicating a first priority; and receives a first radio signal in a target radio resource; the target radio resource belongs to a target resource pool; the first radio signal corresponds to a second priority; if the second priority is lower than the first priority, the target resource pool is orthogonal with the first radio resource group; if the second priority is higher than the first priority, the target resource pool overlaps with the first radio resource group.

In one embodiment, the first communication device 410 comprises a memory that stores a computer readable instruction program. The computer readable instruction program generates an action when executed by at least one processor. The action includes: transmitting first control information, the first control information being used for indicating a first radio resource group, and the first control information being used for indicating a first priority; and receiving a first radio signal in a target radio resource; the target radio resource belongs to a target resource pool; the first radio signal corresponds to a second priority; if the second priority is lower than the first priority, the target resource pool is orthogonal with the first radio resource group; if the second priority is higher than the first priority, the target resource pool overlaps with the first radio resource group.

In one embodiment, at least one of the antenna 452, the receiver 454, the multi-antenna receiving processor 458, the receiving processor 456, the controller/processor 459, the memory 460 or the data source 467 is used for receiving the first control information in the present disclosure.

In one embodiment, at least one of the antenna 452, the receiver 454, the multi-antenna receiving processor 458, the receiving processor 456, the controller/processor 459, the memory 460 or the data source 467 is used for choosing the target radio resource from the target resource pool.

In one embodiment, at least one of the antenna 452, the transmitter 454, the multi-antenna transmitting processor 458, the transmitting processor 468, the controller/processor 459, the memory 460 or the data source 467 is used for transmitting the first radio signal in the target radio resource in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting the second control information in the present disclosure.

In one embodiment, at least one of the antenna 452, the receiver 454, the multi-antenna receiving processor 458, the receiving processor 456, the controller/processor 459, the memory 460 or the data source 467 is used for receiving the third control information in the present disclosure.

In one embodiment, at least one of the antenna 452, the receiver 454, the multi-antenna receiving processor 458, the receiving processor 456, the controller/processor 459, the memory 460 or the data source 467 is used for monitoring the first control information.

In one embodiment, at least one of the antenna 452, the transmitter 454, the multi-antenna transmitting processor 458, the transmitting processor 468, the controller/processor 459, the memory 460 or the data source 467 is used for transmitting the fourth control information in the present disclosure.

In one embodiment, at least one of the antenna 452, the receiver 454, the multi-antenna receiving processor 458, the receiving processor 456, the controller/processor 459, the memory 460 or the data source 467 is used for detecting the Q first-type signal(s) within the first time window in the present disclosure.

In one embodiment, at least one of the antenna 452, the receiver 454, the multi-antenna receiving processor 458, the receiving processor 456, the controller/processor 459, the memory 460 or the data source 467 is used for receiving the fifth control information in the present disclosure.

In one embodiment, at least one of the antenna 452, the receiver 454, the multi-antenna receiving processor 458, the receiving processor 456, the controller/processor 459, the memory 460 or the data source 467 is used for receiving the first configuration information in the present disclosure.

In one embodiment, at least one of the antenna 420, the transmitter 418, the multi-antenna transmitting processor 471, the transmitting processor 416, the controller/processor 475 or the memory 476 is used for transmitting the first control information in the present disclosure.

In one embodiment, at least one of the antenna 420, the receiver 418, the multi-antenna receiving processor 472, the receiving processor 470, the controller/processor 475 or the memory 476 is used for receiving the first radio signal in a target radio resource of the present disclosure.

In one embodiment, at least one of the antenna 420, the receiver 418, the multi-antenna receiving processor 472, the receiving processor 470, the controller/processor 475 or the memory 476 is used for receiving the second control information in the present disclosure.

In one embodiment, at least one of the antenna 420, the transmitter 418, the multi-antenna transmitting processor 471, the transmitting processor 416, the controller/processor 475 or the memory 476 is used for transmitting the third control information in the present disclosure.

In one embodiment, at least one of the antenna 420, the receiver 418, the multi-antenna receiving processor 472, the receiving processor 470, the controller/processor 475 or the memory 476 is used for receiving the fourth control information in the present disclosure.

In one embodiment, at least one of the antenna 420, the receiver 418, the multi-antenna receiving processor 472, the receiving processor 470, the controller/processor 475 or the memory 476 is used for monitoring the fourth control information in the present disclosure.

In one embodiment, at least one of the antenna 420, the receiver 418, the multi-antenna receiving processor 472, the receiving processor 470, the controller/processor 475 or the memory 476 is used for receiving the second configuration information in the present disclosure.

Embodiment 5

Figure 5:
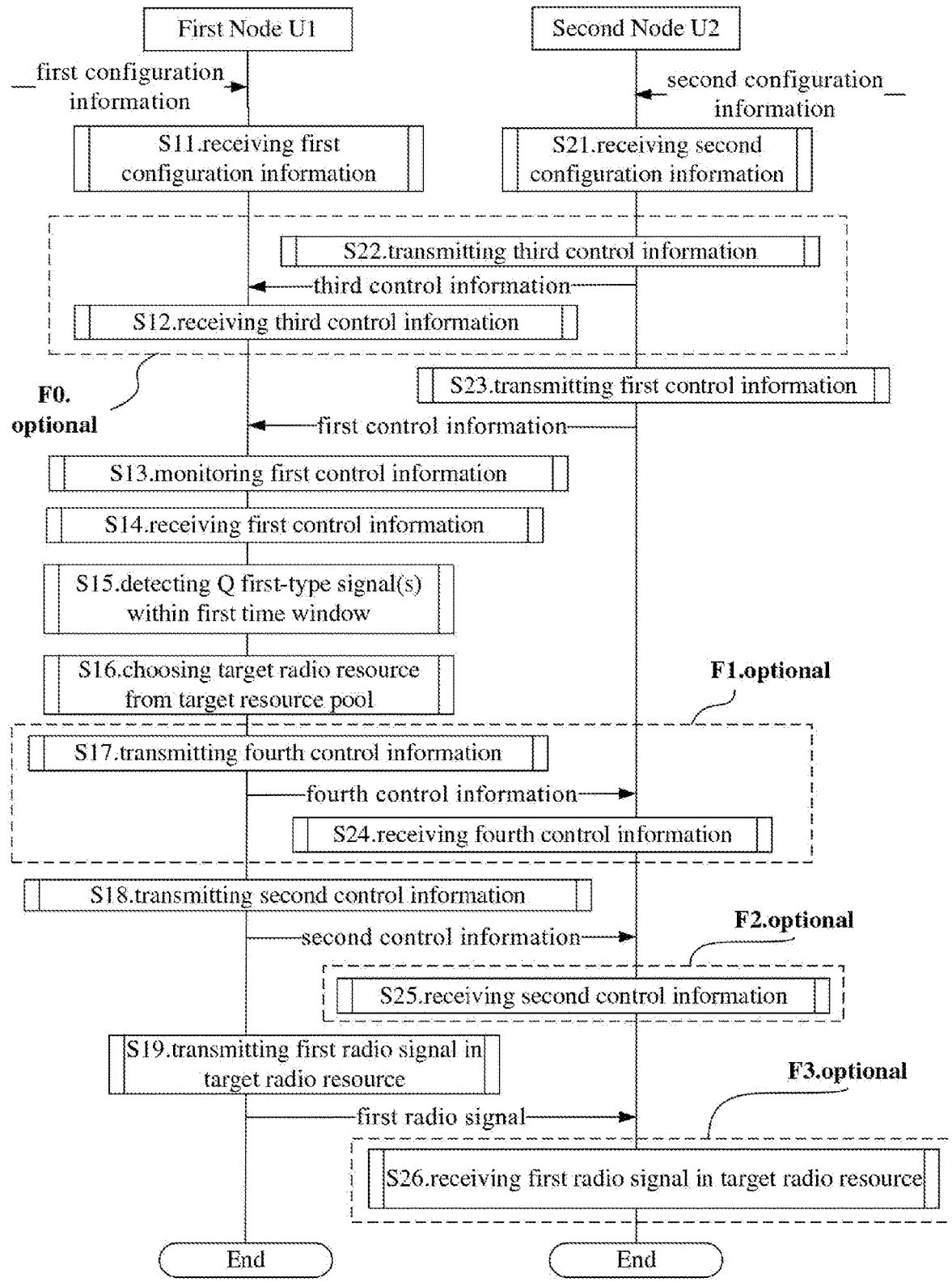
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a first node U1 and a second node U2 are communication nodes that transmit via sidelink. In FIG. 5, steps in dotted line framed boxes F0, F1, F2 and F3 are optional, respectively.

The first node U1 receives first configuration information in step S11; receives third control information in step S12; monitors first control information in step S13; receives first control information in step S14; detects Q piece(s) of first-type information in a first time window in step S15; choose a target radio resource from a target resource pool in step S14; transmits fourth control information in step S17; transmits second control information in step S18; and transmits a first radio signal in a target radio resource in step S19.

The second node U2 receives second configuration in step S21; transmits third control information in step S22; transmits first control information in step S23; receives fourth control information in step S24; receives second control information in step S25; and receives a first radio signal in a target radio resource in step S26.

In Embodiment 5, the first radio signal corresponds to a second priority; if the second priority is lower than the first priority, the target resource pool is orthogonal with the first radio resource group; if the second priority is higher than the first priority, the target resource pool overlaps with the first radio resource group; the second control information is used for indicating at least one of the target radio resource or a transmission format of the first radio signal; the third control information is used for indicating a second radio resource group, the third control information comprises a first reference priority; the first reference priority is used for determining a first threshold, the first threshold is used for determining whether the second radio resource group can be occupied; the second radio resource group comprises the first radio resource group; the first control information comprises a first identifier, the first identifier is used for determining a positive integer number of target receiver(s) of the first control information; the second priority is higher than the first priority, the target radio resource belongs to the first radio resource group, the fourth control information indicates at least one of the second priority or the target radio resource; a result of detection on the Q first-type signal(s) is used for determining the target resource pool; if the second priority is higher than the first priority, at least one of the Q first-type signal(s) is transmitted in the first radio resource group; if the second priority is lower than the first priority, none of the Q first-type signal(s) is transmitted in the first radio resource group; a deadline of the first time window is no later than a start time of the target radio resource in time domain; the first configuration information is used for determining the first candidate resource pool, the first candidate resource pool comprises the first radio resource group and the target resource pool, and comprises the first time window in time domain.

In one embodiment, steps in box F0 of FIG. 5 exist, while steps in box F1 of FIG. 5 do not exist.

In one embodiment, steps in box F0 of FIG. 5 do not exist, while steps in box F1 of FIG. 5 exist.

In one embodiment, steps in box F0 and box F1 of FIG. 5 exist.

In one embodiment, if the second priority is lower than the first priority, step in box F2 and step in box F3 of FIG. 5 do not exist.

In one embodiment, if the second priority is lower than the first priority, step in box F2 and step in box F3 of FIG. 5 both exist.

In one embodiment, the monitoring refers to reception based on blind detection, which means the first node U1 receives a signal within the first time window and performs decoding.

In one embodiment, the monitoring refers to reception based on coherent detection, which means the first node U1 performs coherent reception for a radio signal using an RS sequence corresponding to the DMRS of the first control information within the first time window, and measures the energy of the signal acquired by the coherent reception.

In one embodiment, the monitoring refers to reception based on energy detection, which means the first node U1 senses the energy of a radio signal within the first time window, and averages the energy in time to acquire a received energy.

In one embodiment, the monitoring comprises a measurement on a Received Signal Strength Indicator (RSSI) for the first control information.

In one embodiment, the monitoring comprises a blind detection on a Numerology employed by the first control information.

In one embodiment, the monitoring comprises a blind detection on a subcarrier spacing of subcarriers occupied by the first control information.

In one embodiment, the monitoring comprises a blind detection on a number of multicarrier symbols occupied by the first control information.

In one embodiment, the monitoring comprises a blind detection on the length of Cyclic Prefix (CP) of multicarrier symbols occupied by the first control information.

In one embodiment, the monitoring refers to reception based on coherent detection, which means the first node U1 performs coherent reception for a radio signal using an RS sequence corresponding to the DMRS of the first control signaling within the first time window, and measures the energy of the signal acquired by the coherent reception.

In one embodiment, the monitoring comprises a measurement on an RSSI for the first control signaling.

In one embodiment, the monitoring comprises a blind detection on a numerology employed by the first control signaling.

In one embodiment, the monitoring comprises a blind detection on a subcarrier spacing of subcarriers occupied by the first control signaling.

In one embodiment, the monitoring comprises a blind detection on a number of multicarrier symbols occupied by the first control signaling.

In one embodiment, the monitoring comprises a blind detection on the length of CP of multicarrier symbols occupied by the first control signaling.

In one embodiment, the Q first-type signal(s) is(are) transmitted in the first time window.

In one embodiment, the Q first-type signal(s) is(are) respectively transmitted in Q first-type time-frequency resource unit(s), wherein the Q first-type time-frequency resource unit(s) is(are) located within the first time window.

In one embodiment, at least one of the Q first-type signal(s) is transmitted in the second radio resource group.

In one embodiment, any of the Q first-type signal(s) is transmitted through the third-type channel in the present disclosure.

In one embodiment, any of the Q first-type signal(s) is transmitted on a PSCCH.

In one embodiment, any of the Q first-type signal(s) is transmitted on a PSSCH.

In one embodiment, any of the Q first-type signal(s) is transmitted through the second-type channel in the present disclosure.

In one embodiment, one of the Q first-type signal(s) is transmitted via broadcast.

In one embodiment, one of the Q first-type signal(s) is transmitted via groupcast.

In one embodiment, one of the Q first-type signal(s) is transmitted via unicast.

In one embodiment, one of the Q first-type signal(s) is cell-specific.

In one embodiment, one of the Q first-type signal(s) is UE-specific.

In one embodiment, one of the Q first-type signal(s) comprises one or a plurality of fields of a piece of SCI.

In one embodiment, one of the Q first-type signal(s) comprises a second bit block, wherein the second bit block comprises a positive integer number of bits arranged in sequence.

In one embodiment, the second bit block comprises a CB.

In one embodiment, the second bit block comprises a CBG.

In one embodiment, the second bit block comprises a TB.

In one embodiment, the second bit block is obtained after a TB is subjected to TB-level CRC attachment.

In one embodiment, the second bit block is a CB of a code block acquired after a TB is sequentially subjected to TB-level CRC attachment, code block segmentation, and code block-level CRC attachment.

In one embodiment, one of the Q first-type signal(s) is acquired after all or part of bits of the second bit block are subjected to the first pre-processes in the present disclosure.

In one embodiment, one of the Q first-type signal(s) is acquired after all or part of bits of the second bit block are subjected to the second pre-processes in the present disclosure.

In one embodiment, one of the Q first-type signal(s) is an output after all or part of bits of the second bit block are subjected to the first pre-processes in the present disclosure.

In one embodiment, one of the Q first-type signal(s) is an output after all or part of bits of the second bit block are subjected to the second pre-processes in the present disclosure.

In one embodiment, only the second bit block is used for generating one of the Q first-type signal(s).

In one embodiment, a code block other than the second bit block is also used for generating one of the Q first-type signal(s).

In one embodiment, all transmitter(s) of the Q first-type signal(s) is(are) the second node U2.

In one embodiment, none of transmitter(s) of the Q first-type signal(s) is the second node U2.

In one embodiment, a transmitter of one of the Q first-type signal(s) is the second node U2.

In one embodiment, a transmitter of one of the Q first-type signal(s) is not the second node U2.

In one embodiment, the first node U1 self-determines the target time-frequency resource.

In one embodiment, the first node U1 determines the target time-frequency resource according signal sensing.

In one embodiment, the target time-frequency resource comprises one of time-frequency resource units with the smallest channel quality out of the target resource pool.

In one embodiment, the target time-frequency resource comprises one of time-frequency resource units with the smallest index out of the target resource pool.

In one embodiment, the signal sensing refers to performing coherent reception for a radio signal using an RS sequence corresponding to the DMRS of the radio signal and measuring the energy of a signal acquired after the coherent reception.

In one embodiment, the signal sensing refers to receiving the energy of a radio signal and averaging the energy in time to acquire a received energy.

In one embodiment, the signal sensing means that after a radio signal is received based on a blind detection, whether a decoding is correct is determined according to a CRC bit.

In one embodiment, the first configuration information is transmitted via a radio signal.

In one embodiment, the first configuration information is transmitted via a Uu interface.

In one embodiment, the first configuration information is transmitted through a network of a cell where the first node U1 is located.

In one embodiment, the first configuration information is transferred from a higher layer of the first node U1 to a physical layer of the first node U1.

In one embodiment, the first configuration information is transferred internally within the first node U1.

In one embodiment, the first configuration information is transmitted through the first-type channel in the present disclosure.

In one embodiment, the first configuration information is transmitted through the third-type channel in the present disclosure.

In one embodiment, the first configuration information is transmitted via broadcast.

In one embodiment, the first configuration information is transmitted via groupcast.

In one embodiment, the first configuration information is transmitted via unicast.

In one embodiment, the first configuration information is cell-specific.

In one embodiment, the first configuration information is UE-specific.

In one embodiment, the first configuration information comprises all or part of a higher layer signaling.

In one embodiment, the first configuration information comprises all or part of an RRC layer signaling.

In one embodiment, the first configuration information comprises one or a plurality of fields of an RRC IE.

In one embodiment, the first configuration information comprises one or a plurality of fields of a SIB.

In one embodiment, the first configuration information comprises one or a plurality of fields of a piece of RMSI.

In one embodiment, the first configuration information comprises one or a plurality of fields of a piece of OSI.

In one embodiment, the first configuration information comprises all or part of a MAC layer signaling.

In one embodiment, the first configuration information comprises one or a plurality of fields of a MAC CE.

In one embodiment, the first configuration information comprises one or a plurality of fields of a PHY layer signaling.

In one embodiment, the first configuration information comprises one or a plurality of fields of a piece of DCI.

In one embodiment, the first configuration information comprises one or a plurality of fields of a DCI format.

In one embodiment, the first configuration information comprises one or a plurality of fields of a piece of SCI.

In one embodiment, the first configuration information is semi-statically configured.

In one embodiment, the first configuration information is dynamically configured.

In one embodiment, the first configuration information is used for determining the first candidate resource pool.

In one embodiment, the first configuration information explicitly indicates the first candidate resource pool.

In one embodiment, the first configuration information implicitly indicates the first candidate resource pool.

In one embodiment, the first configuration information comprises a time domain bitmap, a frequency domain unit size, a number of frequency domain units and a start position of frequency domain units of the first candidate resource pool.

In one embodiment, the time domain unit bitmap includes a Subframe bitmap.

In one embodiment, the time domain unit bitmap includes a Slot bitmap.

In one embodiment, the frequency domain unit size refers to BWP size.

In one embodiment, the frequency domain unit size refers to a number of RBs comprised by a BWP in frequency domain.

In one embodiment, the frequency domain unit size refers to a subchannel size.

In one embodiment, the frequency domain unit size refers to a number of RBs comprised by a subchannel in frequency domain.

In one embodiment, the frequency domain unit size refers to RB size.

In one embodiment, the frequency domain unit size refers to a number of subcarriers comprised by an RB in frequency domain.

In one embodiment, the number of frequency domain units refers to a number of BWPs comprised in the first candidate resource pool.

In one embodiment, the number of frequency domain units refers to a subchannel number comprised in the first candidate resource pool.

In one embodiment, the number of frequency domain units refers to a number of RBs comprised in the first candidate resource pool.

In one embodiment, the number of frequency domain units refers to a number of subcarriers comprised in the first candidate resource pool.

In one embodiment, the start position of frequency domain units refers to an RB with a lowest index of all RBs comprised in a BWP with a lowest index out of the positive integer number of BWPs.

In one embodiment, the start position of frequency domain units refers to an RB with a lowest index of all RBs comprised in a subchannel with a lowest index out of the positive integer number of subchannels.

In one embodiment, the start position of frequency domain units refers to a subcarrier with a lowest index of all subcarriers comprised in an RB with a lowest index out of the positive integer number of RBs.

In one embodiment, the first configuration information comprises the first candidate resource pool ID, the first candidate resource pool is one of a positive integer number of candidate resource pools, and the first candidate resource pool ID is used for choosing the first candidate resource pool from the positive integer number of candidate resource pools.

In one embodiment, the first configuration information comprises a first threshold list, wherein the first threshold list comprises a positive integer number of first-type thresholds.

Embodiment 6

Figure 6:
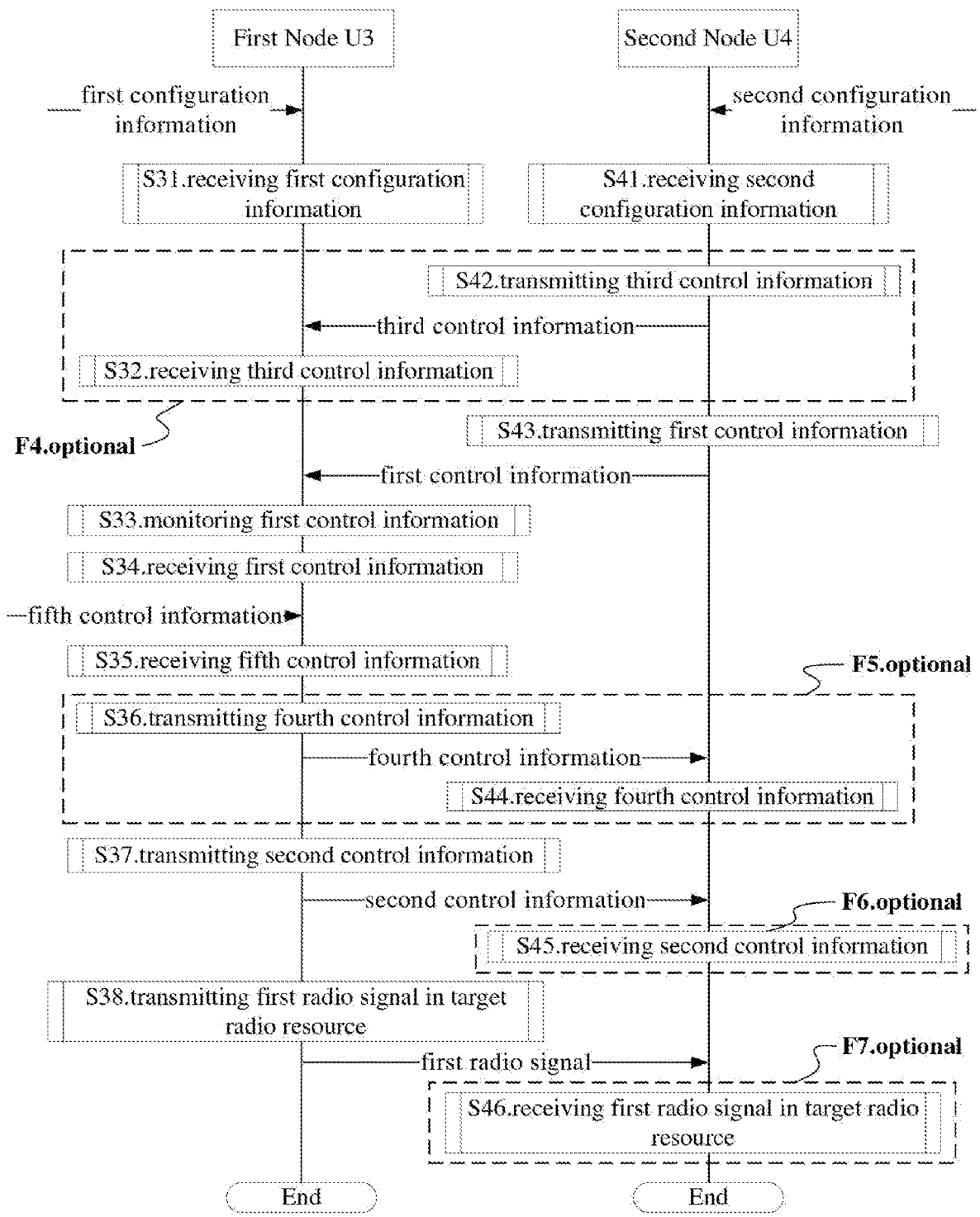
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a first node U3 and a second node U4 are communication nodes that transmit via sidelink. In FIG. 6, steps in dotted boxes F4, F5, F6 and F7 are optional, respectively.

The first node U3 receives first configuration information in step S31; receives third control information in step S32; monitors first control information in step S33; receives first control information in step S34; receives fifth control information in step S35; transmits fourth control information in step S36; transmits second control information in step S37; and transmits a first radio signal in a target radio resource in step S38.

The second node U4 receives second confirmation information in step S41; transmits third control information in step S42; transmits first control information in step S43; receives fourth control information in step S44; receives second control information in step S45; and receives a first radio signal in a target radio resource in step S46.

In Embodiment 6, the first radio signal corresponds to a second priority; if the second priority is lower than the first priority, the target resource pool is orthogonal with the first radio resource group; if the second priority is higher than the first priority, the target resource pool overlaps with the first radio resource group;

The second control information is used for indicating at least one of the target radio resource or a transmission format of the first radio signal;

The third control information is used for indicating a second radio resource group, the third control information comprises a first reference priority; the first reference priority is used for determining a first threshold, the first threshold is used for determining whether the second radio resource group can be occupied; the second radio resource group comprises the first radio resource group;

The first control information comprises a first identifier, the first identifier is used for determining a positive integer number of target receiver(s) of the first control information;

The second priority is higher than the first priority, the target radio resource belongs to the first radio resource group, the fourth control information indicates at least one of the second priority or the target radio resource;

The fifth control information is used for indicating the target radio resource;

The first configuration information is used for determining the first candidate resource pool, the first candidate resource pool comprises the first radio resource group and the target resource pool, and comprises the first time window in time domain.

If no conflict is incurred, the characteristics in Embodiment 5 of the present disclosure can be applied to Embodiment 6.

In one embodiment, if the third node U3 receives the Q piece(s) of first-type information, steps in box F1 of FIG. 6 exist.

In one embodiment, if the third node U3 does not receive the Q piece(s) of first-type information, steps in box F1 of FIG. 6 do not exist.

In one embodiment, the fifth control information is transmitted via a radio signal.

In one embodiment, the fifth control information is transmitted via a PC5 interface.

In one embodiment, the fifth control information is transmitted through the third-type channel in the present disclosure.

In one embodiment, the fifth control information is transmitted through the second-type channel in the present disclosure.

In one embodiment, the fifth control information is transmitted via broadcast.

In one embodiment, the fifth control information is transmitted via groupcast.

In one embodiment, the fifth control information is transmitted via unicast.

In one embodiment, the fifth control information is cell-specific.

In one embodiment, the fifth control information is UE-specific.

In one embodiment, the fifth control information comprises all or part of a higher layer signaling.

In one embodiment, the fifth control information comprises all or part of an RRC layer signaling.

In one embodiment, the fifth control information comprises one or a plurality of fields of an RRC IE.

In one embodiment, the fifth control information comprises one or a plurality of fields of a SIB.

In one embodiment, the fifth control information comprises one or a plurality of fields of a piece of RMSI.

In one embodiment, the fifth control information comprises one or a plurality of fields of a piece of OSI.

In one embodiment, the fifth control information comprises all or part of a MAC layer signaling.

In one embodiment, the fifth control information comprises one or a plurality of fields of a MAC CE.

In one embodiment, the fifth control information comprises one or a plurality of fields of a PHY layer signaling.

In one embodiment, the fifth control information comprises one or a plurality of fields of a piece of SCI.

In one embodiment, the fifth control information comprises one or a plurality of fields of an SCI format.

In one embodiment, the fifth control information comprises one or a plurality of fields of a piece of UCI.

In one embodiment, the fifth control information is semi-statically configured.

In one embodiment, the fifth control information is dynamically configured.

In one embodiment, the fifth control information explicitly indicates the target radio resource.

In one embodiment, the fifth control information implicitly indicates the target radio resource.

In one embodiment, the fifth control information indicates all time domain units comprised by the target radio resource.

In one embodiment, the fifth control information indicates a first time domain unit of the X5 time domain units comprised by the target radio resource.

In one embodiment, the fifth control information indicates a last time domain unit of the X5 time domain units comprised by the target radio resource.

In one embodiment, the fifth control information indicates an earliest time domain unit of the X5 time domain units comprised by the target radio resource.

In one embodiment, the fifth control information indicates a latest time domain unit of the X5 time domain units comprised by the target radio resource.

In one embodiment, the fifth control information indicates a first time domain unit of the X5 time domain units comprised by the target radio resource and a time interval of the X5 time domain units.

In one embodiment, the fifth control information indicates all frequency domain units comprised by the target radio resource.

In one embodiment, the fifth control information indicates a first frequency domain unit of the Y5 frequency domain units comprised by the target radio resource.

In one embodiment, the fifth control information indicates a last frequency domain unit of the Y5 frequency domain units comprised by the target radio resource.

In one embodiment, the fifth control information indicates a lowest frequency domain unit of the Y5 frequency domain units comprised by the target radio resource.

In one embodiment, the fifth control information indicates a highest frequency domain unit of the Y5 frequency domain units comprised by the target radio resource.

In one embodiment, the fifth control information indicates a first frequency domain unit of the Y5 frequency domain units comprised by the target radio resource and a frequency interval of the Y5 frequency domain units.

In one embodiment, the fifth control information comprises all time-frequency resource units comprised by the target radio resource.

In one embodiment, the fifth control information is used for indicating the target radio resource out of the target resource pool in the present disclosure.

In one embodiment, the fifth control information is used for indicating the target radio resource out of the first radio resource group in the present disclosure.

In one embodiment, the fifth control information is used for indicating the target radio resource out of the second radio resource group in the present disclosure.

In one embodiment, the fifth control information is used for indicating the target radio resource out of a first candidate resource pool in the present disclosure.

In one embodiment, the fifth control information comprises an index of the target radio resource in the first candidate resource pool.

In one embodiment, the fifth control information comprises an index of the target radio resource in the target resource pool.

In one embodiment, the fifth control information comprises an index of the target radio resource in the first radio resource group.

In one embodiment, the fifth control information comprises an index of the target radio resource in the second radio resource group.

In one embodiment, the fifth control information comprises an index of a first time domain unit of the X5 time domain units comprised by the target radio resource in the first radio resource group.

In one embodiment, the fifth control information comprises an index of a first time domain unit of the X5 time domain units comprised by the target radio resource in the first candidate resource pool.

In one embodiment, the fifth control information comprises an index of a first time domain unit of the X5 time domain units comprised by the target radio resource in the first radio resource group and a time interval of the X5 time domain units.

In one embodiment, the fifth control information comprises an index of a first time domain unit of the X5 time domain units comprised by the target radio resource in the first candidate resource pool and a time interval of the X5 time domain units.

In one embodiment, the fifth control information comprises a time offset between the target radio resource and a first time domain unit out of the first candidate resource pool.

In one embodiment, the fifth control information comprises a time offset between the target radio resource and a first time domain unit out of the first radio resource group.

In one embodiment, the fifth control information comprises a frequency offset between the target radio resource and a first frequency domain unit out of the first candidate resource pool.

In one embodiment, the fifth control information comprises a frequency offset between the target radio resource and a first frequency domain unit out of the first radio resource group.

In one embodiment, the fifth control information comprises a positive integer number of bits, the positive integer number of bits comprised by the fifth control information respectively correspond to the X4 time domain units comprised by the target resource pool.

In one embodiment, the fifth control information comprises a positive integer number of bits, the positive integer number of bits comprised by the fifth control information respectively correspond to the Y4 frequency domain units comprised by the target resource pool.

In one embodiment, the second configuration information is transmitted via a radio signal.

In one embodiment, the second configuration information is transmitted via a Uu interface.

In one embodiment, the second configuration information is transmitted through a network of a cell where the second node U2 is located.

In one embodiment, the second configuration information is transferred from a higher layer of the second node U2 to a physical layer of the first node U1.

In one embodiment, the second configuration information is transferred internally within the second node U2.

In one embodiment, the second configuration information is transmitted through the first-type channel in the present disclosure.

In one embodiment, the second configuration information is transmitted through the third-type channel in the present disclosure.

In one embodiment, the second configuration information is transmitted via broadcast.

In one embodiment, the second configuration information is transmitted via groupcast.

In one embodiment, the second configuration information is transmitted via unicast.

In one embodiment, the second configuration information is cell-specific.

In one embodiment, the second configuration information is UE-specific.

In one embodiment, the second configuration information comprises all or part of a higher layer signaling.

In one embodiment, the second configuration information comprises all or part of an RRC layer signaling.

In one embodiment, the second configuration information comprises one or a plurality of fields of an RRC IE.

In one embodiment, the second configuration information comprises one or a plurality of fields of a SIB.

In one embodiment, the second configuration information comprises one or a plurality of fields of a piece of RMSI.

In one embodiment, the second configuration information comprises one or a plurality of fields of a piece of OSI.

In one embodiment, the second configuration information comprises all or part of a MAC layer signaling.

In one embodiment, the second configuration information comprises one or a plurality of fields of a MAC CE.

In one embodiment, the second configuration information comprises one or a plurality of fields of a PHY layer signaling.

In one embodiment, the second configuration information comprises one or a plurality of fields of a piece of DCI.

In one embodiment, the second configuration information comprises one or a plurality of fields of a DCI format.

In one embodiment, the second configuration information comprises one or a plurality of fields of a piece of SCI.

In one embodiment, the second configuration information is semi-statically configured.

In one embodiment, the second configuration information is dynamically configured.

In one embodiment, the second configuration information comprises a time domain bitmap, a frequency domain unit size, a number of frequency domain units and a start position of frequency domain units of the first candidate resource pool.

In one embodiment, the second configuration information comprises the first candidate resource pool ID, the first candidate resource pool is one of a positive integer number of candidate resource pools, and the first candidate resource pool ID is used for choosing the first candidate resource pool from the positive integer number of candidate resource pools.

In one embodiment, the second configuration information comprises a first threshold list, wherein the first threshold list comprises a positive integer number of first-type thresholds.

Embodiment 7

Figure 7:
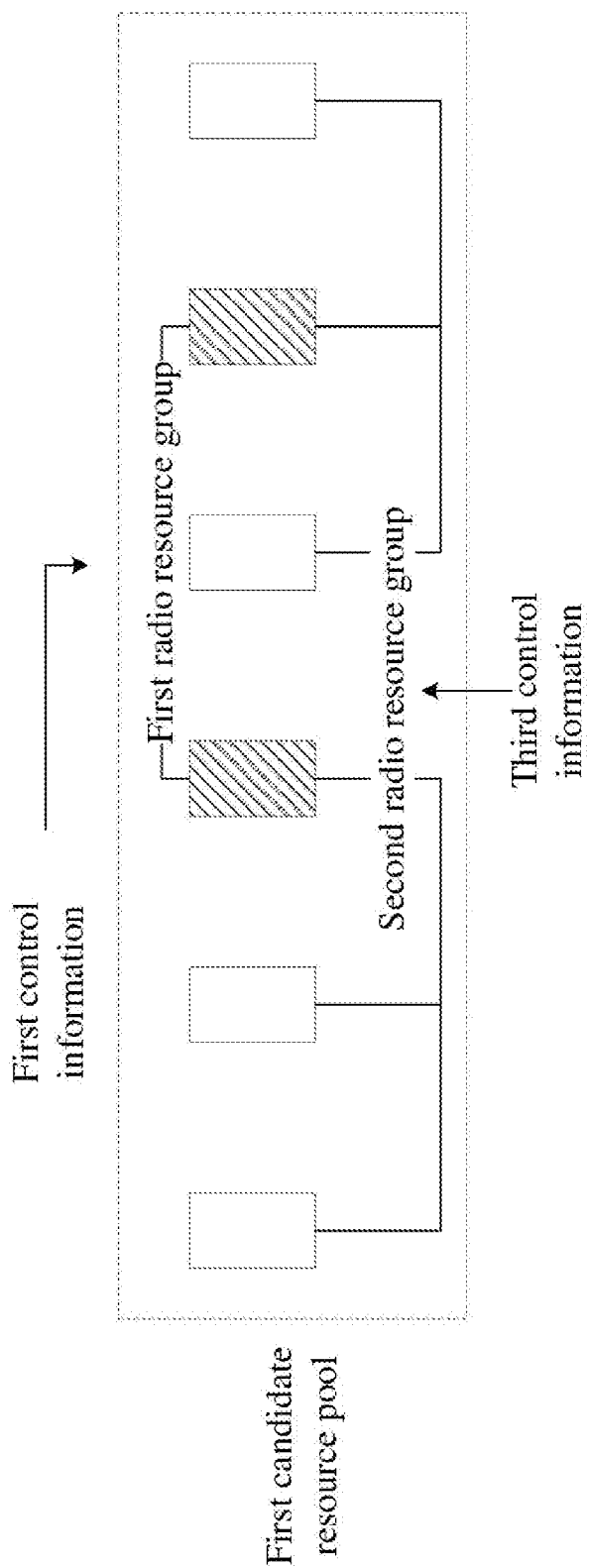
FIG. 7 illustrates a schematic diagram of relations between a first candidate resource pool, a first radio resource group and a second radio resource group according to one embodiment of the present disclosure.

Embodiment 7 illustrates a schematic diagram of relations between a first candidate resource pool, a first radio resource group and a second radio resource group according to one embodiment of the present disclosure, as shown in FIG. 7. In FIG. 7, the large dotted box represents a first candidate resource pool of the present disclosure; the solid boxes represent a second radio resource group of the present disclosure; the slash-filled solid boxes represent a first radio resource group of the present disclosure.

In Embodiment 7, the third control information in the present disclosure is used for indicating the second radio resource group; the second radio resource group comprises the first radio resource group in the present disclosure. In Embodiment 7, the third control information comprises a first reference priority, the first reference priority is used for determining a first threshold, the first threshold is used for determining whether the second radio resource group can be occupied.

In one embodiment, the second radio resource group belongs to the third-type channels in the present disclosure.

In one embodiment, the second radio resource group comprises the third-type channels in the present disclosure.

In one embodiment, the second radio resource group belongs to the second-type channels in the present disclosure.

In one embodiment, the second radio resource group comprises the second-type channels in the present disclosure.

In one embodiment, the second radio resource group comprises X2 time domain units; X2 is a positive integer.

In one embodiment, the second radio resource group comprises Y2 frequency domain units; Y2 is a positive integer.

In one embodiment, the second radio resource group comprises Z2 time-frequency resource units; Z2 is a positive integer.

In one embodiment, the X2 time domain units comprised by the second radio resource group include the X1 time domain units comprised by the first radio resource group; the X2 is no less than the X1.

In one embodiment, the Y2 frequency domain units comprised by the second radio resource group include the Y1 frequency domain units comprised by the first radio resource group; the Y2 is no less than the Y1.

In one embodiment, the Z2 time-frequency resource units comprised by the second radio resource group include the Z1 time-frequency resource units comprised by the first radio resource group; the Z2 is no less than the Z1.

In one embodiment, the second radio resource group is reserved for a transmitter of the third control information.

In one embodiment, the first candidate resource pool belongs to the third-type channels in the present disclosure.

In one embodiment, the first candidate resource pool comprises the third-type channels in the present disclosure.

In one embodiment, the first candidate resource pool belongs to the second-type channels in the present disclosure.

In one embodiment, the first candidate resource pool comprises the second-type channels in the present disclosure.

In one embodiment, the first candidate resource pool comprises X3 time domain units; X3 is a positive integer.

In one embodiment, the first candidate resource pool comprises Y3 frequency domain units; Y3 is a positive integer.

In one embodiment, the first candidate resource pool comprises Z3 time-frequency resource units; Z3 is a positive integer.

In one embodiment, the X3 time domain units comprised by the first candidate resource pool include the X2 time domain units comprised by the second radio resource group; the X3 is no less than the X2.

In one embodiment, the Y3 frequency domain units comprised by the first candidate resource pool include the Y2 frequency domain units comprised by the second radio resource group; the Y3 is no less than the Y2.

In one embodiment, the Z3 time-frequency resource units comprised by the first candidate resource pool include the Z2 time-frequency resource units comprised by the second radio resource group; the Z3 is no less than the Z2.

In one embodiment, the X3 time domain units comprised by the first candidate resource pool include the X4 time domain units comprised by the target resource pool; the X3 is no less than the X4.

In one embodiment, the Y3 frequency domain units comprised by the first candidate resource pool include the Y4 frequency domain units comprised by the target resource pool; the Y3 is no less than the Y4.

In one embodiment, the Z3 time-frequency resource units comprised by the first candidate resource pool include the Z4 time-frequency resource units comprised by the target resource pool; the Z3 is no less than the Z4.

In one embodiment, each of the Z3 time-frequency resource units comprised by the first candidate resource pool has a same numerology.

In one embodiment, subcarriers occupied by each of the Z3 time-frequency resource units comprised by the first candidate resource pool in frequency domain have a same subcarrier spacing (SCS).

In one embodiment, multicarrier symbols occupied by each of the Z3 time-frequency resource units comprised by the first candidate resource pool in time domain have a same symbol duration.

In one embodiment, the third control information is transmitted via a radio signal.

In one embodiment, the third control information is transmitted via a PC5 interface.

In one embodiment, the third control information is transmitted through the third-type channel in the present disclosure.

In one embodiment, the third control information is transmitted through the second-type channel in the present disclosure.

In one embodiment, the third control information is transmitted via broadcast.

In one embodiment, the third control information is transmitted via groupcast.

In one embodiment, the third control information is transmitted via unicast.

In one embodiment, the third control information is cell-specific.

In one embodiment, the third control information is UE-specific.

In one embodiment, the third control information comprises all or part of a higher layer signaling.

In one embodiment, the third control information comprises all or part of an RRC layer signaling.

In one embodiment, the third control information comprises one or a plurality of fields of an RRC IE.

In one embodiment, the third control information comprises one or a plurality of fields of a SIB.

In one embodiment, the third control information comprises one or a plurality of fields of a piece of RMSI.

In one embodiment, the third control information comprises one or a plurality of fields of a piece of OSI.

In one embodiment, the third control information comprises all or part of a MAC layer signaling.

In one embodiment, the third control information comprises one or a plurality of fields of a MAC CE.

In one embodiment, the third control information comprises one or a plurality of fields of a PHY layer signaling.

In one embodiment, the third control information comprises one or a plurality of fields of a piece of SCI.

In one embodiment, the third control information comprises one or a plurality of fields of a piece of UCI.

In one embodiment, the third control information is semi-statically configured.

In one embodiment, the third control information is dynamically configured.

In one embodiment, the third control information explicitly indicates the second radio resource group.

In one embodiment, the third control information implicitly indicates the second radio resource group.

In one embodiment, the third control information indicates all time domain units comprised by the second radio resource group.

In one embodiment, the third control information indicates a first time domain unit of the X2 time domain units comprised in the second radio resource group.

In one embodiment, the third control information indicates a last time domain unit of the X2 time domain units comprised in the second radio resource group.

In one embodiment, the third control information indicates an earliest time domain unit of the X2 time domain units comprised in the second radio resource group.

In one embodiment, the third control information indicates a last time domain unit of the X2 time domain units comprised in the second radio resource group.

In one embodiment, the third control information indicates a first time domain unit of the X2 time domain units comprised in the second radio resource group and a time interval of the X2 time domain units.

In one embodiment, the third control information indicates all frequency domain units comprised by the second radio resource group.

In one embodiment, the third control information indicates a first frequency domain unit of the Y2 frequency domain units comprised in the second radio resource group.

In one embodiment, the third control information indicates a last frequency domain unit of the Y2 frequency domain units comprised in the second radio resource group.

In one embodiment, the third control information indicates a lowest frequency domain unit of the Y2 frequency domain units comprised in the second radio resource group.

In one embodiment, the third control information indicates a highest frequency domain unit of the Y2 frequency domain units comprised in the second radio resource group.

In one embodiment, the third control information indicates a first frequency domain unit of the Y2 frequency domain units comprised in the second radio resource group and a frequency interval of the Y2 frequency domain units.

In one embodiment, the third control information comprises all time-frequency resource units comprised by the second radio resource group.

In one embodiment, the third control information is used for indicating the second radio resource group out of a first candidate resource pool in the present disclosure.

In one embodiment, the third control information comprises an index of the second radio resource group in the first candidate resource pool.

In one embodiment, the third control information comprises an index of a first time domain unit of the X2 time domain units comprised by the second radio resource group in the first candidate resource pool.

In one embodiment, the third control information comprises an index of a first time domain unit of the X2 time domain units comprised by the second radio resource group in the first candidate resource pool and a time interval of the X2 time domain units.

In one embodiment, the third control information comprises a time offset between the second radio resource group and a first time domain unit out of the first candidate resource pool.

In one embodiment, the third control information comprises a frequency offset between the second radio resource group and a first frequency domain unit out of the first candidate resource pool.

In one embodiment, the third control information comprises B3 bits, the B3 bits comprised in the third control information respectively correspond to the X3 time domain units comprised by the first candidate resource pool; B3 is a positive integer; the B3 is equal to the X3.

In one embodiment, a third given bit is one of the B3 bits comprised by the third bitmap, a second given time domain unit is one of the X3 time domain units comprised by the first candidate resource pool that corresponds to the third given bit, the third given bit is "1", and the second given time domain unit belongs to the second radio resource group.

In one embodiment, the third control information comprises B4 bits, the B4 bits comprised by the third control information respectively correspond to the Y3 frequency domain units comprised by the first candidate resource pool; B4 is a positive integer; the B4 is equal to the Y3.

In one embodiment, a fourth given bit is one of the B4 bits comprised by the third control information, a second given frequency domain unit is one of the Y3 frequency domain units comprised by the first candidate resource pool the corresponds to the fourth given bit, the fourth given bit is "1", and the second given frequency domain unit belongs to the second radio resource group.

In one embodiment, the third control information comprises uplink/downlink subframe configuration.

In one embodiment, the third control information comprises uplink/downlink slot configuration.

In one embodiment, the third control information comprises uplink/downlink symbol configuration.

In one embodiment, the third control information indicates slot formats.

In one embodiment, the third control information comprises a radio frame number of a radio frame corresponding to one of the X2 time domain units comprised by the second radio resource group.

In one embodiment, the third control information comprises a subframe number of a subframe corresponding to one of the X2 time domain units comprised by the second radio resource group.

In one embodiment, the third control information comprises a slot number of a slot corresponding to one of the X2 time domain units comprised by the second radio resource group.

In one embodiment, the third control information comprises a carrier number of a carrier corresponding to one of the Y2 frequency domain units comprised by the second radio resource group.

In one embodiment, the third control information comprises a BWP number of a BWP corresponding to one of the Y2 frequency domain units comprised by the second radio resource group.

In one embodiment, the third control information comprises an RB number of an RB corresponding to one of the Y2 frequency domain units comprised by the second radio resource group.

In one embodiment, the third control information comprises a PRB number of a PRB corresponding to one of the Y2 frequency domain units comprised by the second radio resource group.

In one embodiment, the third control information comprises a smallest index of indices of a positive integer number of subchannels comprised by one of the Y2 frequency domain units of the second radio resource group in frequency domain.

In one embodiment, the third control information comprises a smallest index of indices of a positive integer number of PRBs comprised in one of the Y2 frequency domain units of the second radio resource group in frequency domain.

In one embodiment, the third control information indicates a number of subchannels comprised by one of the Y2 frequency domain units of the second radio resource group in frequency domain.

In one embodiment, the third control information indicates an index of a smallest PRB comprised by one of the Y2 frequency domain units of the second radio resource group in frequency domain.

In one embodiment, the third control information indicates a number of PRBs comprised by one of the Y2 frequency domain units of the second radio resource group in frequency domain.

In one embodiment, the third control information indicates the center frequency and bandwidth corresponding to one of the Y2 frequency domain units of the second radio resource group in frequency domain.

In one embodiment, the third control information indicates a lowest frequency and a highest frequency of the second radio resource group in frequency domain.

In one embodiment, the third control information indicates a lowest frequency and bandwidth of the second radio resource group when occupying frequency domain resources.

In one embodiment, the third control information indicates an earliest time for time domain resources corresponding to the second radio resource group.

In one embodiment, the third control information indicates a latest time for time domain resources corresponding to the second radio resource group.

In one embodiment, the third control information indicates an earliest time for and the length of time domain resources corresponding to the second radio resource group.

In one embodiment, the third control information comprises a first reference priority, the first reference priority is used for determining a first threshold.

In one embodiment, the third control information explicitly indicates the first reference priority.

In one embodiment, the third control information implicitly indicates the first reference priority.

In one embodiment, the third control information indicates an index of the first reference priority in a positive integer number of first-type reference priorities; the first reference priority is one of the positive integer number of first-type reference priorities.

In one embodiment, a third control signaling comprises the third control information.

In one embodiment, the third control signaling is generated after the third control information is subjected to the first pre-processes in the present disclosure.

In one embodiment, the third control signaling is generated after the third control information is subjected to the second pre-processes in the present disclosure.

In one embodiment, the third control signaling comprises the third-type signals.

In one embodiment, the third control signaling is transmitted on the third-type channel.

In one embodiment, the first reference priority is used for scrambling the third control signaling.

In one embodiment, the first reference priority is used for generating the CRC of the third control signaling.

In one embodiment, the first reference priority is used for determining a demodulation reference signal of the third control signaling.

In one embodiment, the first threshold is one of the positive integer number of first-type thresholds comprised in the first threshold list.

In one embodiment, the first reference priority is used for determining the first threshold.

In one embodiment, the first reference priority is used for determining the first threshold out of the first threshold list.

In one embodiment, the first reference priority corresponds to an index of the first threshold in the first threshold list.

In one embodiment, the first reference priority and the second priority of the present disclosure are jointly used for determining the first threshold.

In one embodiment, the first reference priority and the second priority are used for determining the first threshold out of the first threshold list.

In one embodiment, the first reference priority and the second priority correspond to an index of the first threshold in the first threshold list.

In one embodiment, the first reference priority and the second priority respectively correspond to two-dimensional indexes of the first threshold in the first threshold list.

In one embodiment, the second radio resource group comprises a third radio resource group and a fourth radio resource group, wherein the third radio resource group is no later than the fourth radio resource group.

In one embodiment, the third radio resource group comprises Z6 time-frequency resource units, while the fourth radio resource group comprises Z7 time-frequency resource units; Z6 and Z7 are both positive integers, a sum of the Z6 and the Z7 is no greater than the Z2.

In one embodiment, the Z2 time-frequency resource units comprised by the second radio resource group include the Z6 time-frequency resource units comprised by the third radio resource group; Z2 is no less than the Z6.

In one embodiment, the Z2 time-frequency resource units comprised by the second radio resource group include the Z7 time-frequency resource units comprised by the fourth radio resource group; Z2 is no less than the Z7.

In one embodiment, the fourth radio resource group is orthogonal with the third radio resource group.

In one embodiment, all time-frequency resource units comprised by the third radio resource group are no later than all time-frequency resource units comprised by the fourth radio resource group.

In one embodiment, a start time for the fourth radio resource group is after a deadline of third radio resource group.

In one embodiment, a first time-frequency resource unit is a latest time-frequency resource unit of the Z6 time-frequency resource units comprised by the third radio resource group, the fourth radio resource group comprises the first time-frequency resource unit.

In one embodiment, the first time-frequency resource unit belongs to both the third radio resource group and the fourth radio resource group.

In one embodiment, whether the second radio resource group can be occupied means whether the fourth radio resource group can be occupied.

In one embodiment, the channel quality of a radio signal detected in the Z6 time-frequency resource units comprised by the third radio resource group is used for determining whether the second radio resource group can be occupied.

In one embodiment, the channel quality of a radio signal detected in the Z6 time-frequency resource units comprised by the third radio resource group is used for determining whether the fourth radio resource group can be occupied.

In one embodiment, a linear average of the channel quality of a radio signal detected in the third radio resource group is higher than the first threshold, the fourth radio resource group cannot be occupied.

In one embodiment, a linear average of the channel quality of a radio signal detected in the third radio resource group is lower than the first threshold, the fourth radio resource group can be occupied.

In one embodiment, a linear average of the channel quality of a radio signal detected in the third radio resource group is equal to the first threshold, the fourth radio resource group cannot be occupied.

In one embodiment, a linear average of the channel quality of a radio signal detected in the third radio resource group is equal to the first threshold, the fourth radio resource group can be occupied.

In one embodiment, a linear filtering value of the channel quality of a radio signal detected in the third radio resource group is higher than the first threshold, the fourth radio resource group cannot be occupied.

In one embodiment, a linear filtering value of the channel quality of a radio signal detected in the third radio resource group is lower than the first threshold, the fourth radio resource group can be occupied.

In one embodiment, a linear filtering value of the channel quality of a radio signal detected in the third radio resource group is equal to the first threshold, the fourth radio resource group cannot be occupied.

In one embodiment, a linear filtering value of the channel quality of a radio signal detected in the third radio resource group is equal to the first threshold, the fourth radio resource group cannot be occupied.

In one embodiment, the channel quality of a radio signal detected in the first time-frequency resource unit is used for determining whether the fourth radio resource group can be occupied.

In one embodiment, the channel quality of a radio signal detected in the first time-frequency resource unit is higher than the first threshold, the fourth radio resource group cannot be occupied.

In one embodiment, the channel quality of a radio signal detected in the first time-frequency resource unit is lower than the first threshold, the fourth radio resource group can be occupied.

In one embodiment, the channel quality of a radio signal detected in the first time-frequency resource unit is equal to the first threshold, the fourth radio resource group cannot be occupied.

In one embodiment, the channel quality of a radio signal detected in the first time-frequency resource unit is equal to the first threshold, the fourth radio resource group cannot be occupied.

In one embodiment, the fourth radio resource group comprises the first radio resource group.

In one embodiment, the fourth radio resource group overlaps with the first radio resource group.

Embodiment 8

Figure 8:
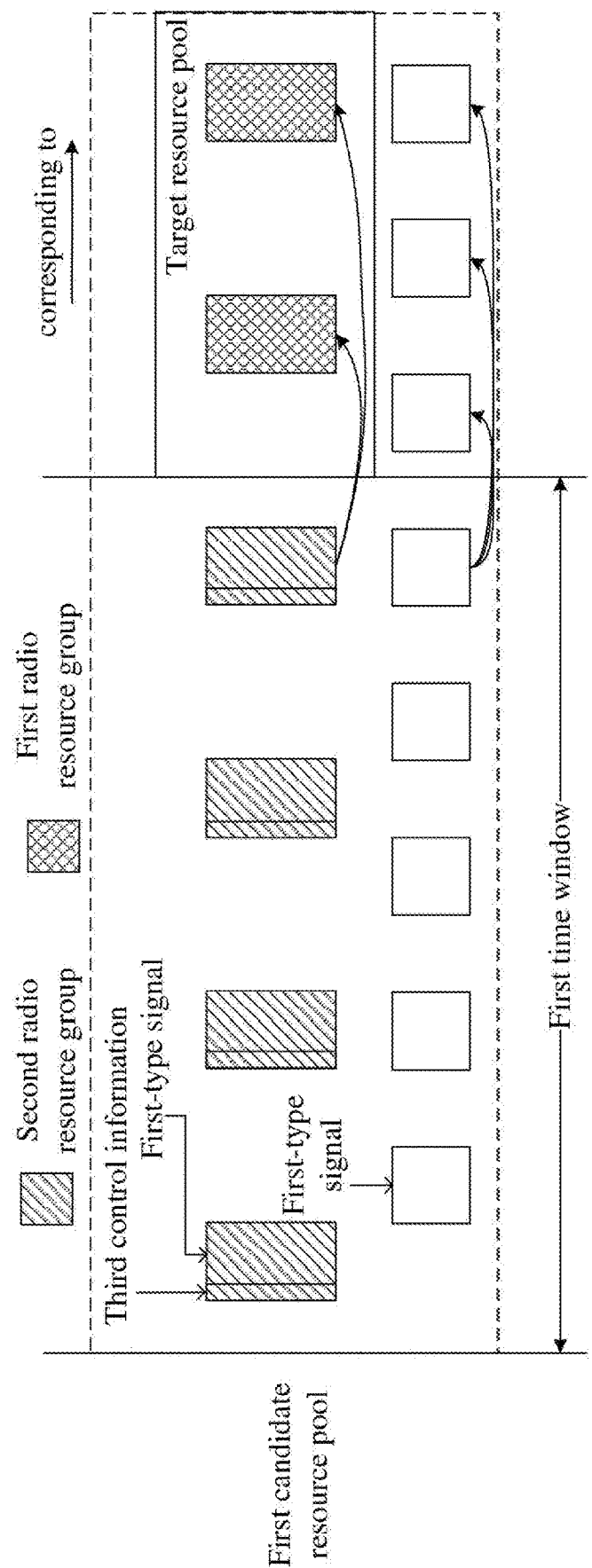
FIG. 8 illustrates a schematic diagram of relations between a first time window, a first radio resource group, a second radio resource group and a target resource pool according to one embodiment of the present disclosure.

Embodiment 8 illustrates a schematic diagram of relations between a first time window, a first radio resource group, a second radio resource group and a target resource pool according to one embodiment of the present disclosure, as shown in FIG. 8. In FIG. 8, the large dotted lined box represents a first candidate resource pool in the present disclosure; the large box marked with thick solid lines represents a target resource pool; the small solid boxes represent time-frequency resource units in the first candidate resource pool; the small solid boxes filled with slashes represent a second radio resource group of the present disclosure; the small solid boxes filled with crosses represent a first radio resource group of the present disclosure; and the arrows represent that time-frequency resource units behind the first time window correspond to time-frequency resource units.

In Embodiment 8, a detection is performed on Q first-type signal(s) of the present disclosure in time-frequency resource units comprised by the first time window, Q is a positive integer; a result of the detection on the Q first-type signal(s) is used for determining the target resource pool; the target resource pool comprises the target radio resource of the present disclosure; a deadline of the first time window is no later than a start time of the target radio resource in time domain.

In one embodiment, the Q first-type signal(s) is(are) transmitted in Q first-type time-frequency resource unit(s), the Q first-type time-frequency resource unit(s) is(are) within the first time window; the Q is a positive integer.

In one embodiment, any two of the Q first-type time-frequency resource units have the same duration in time domain.

In one embodiment, the Q first-type time-frequency resource units are consecutive in time domain.

In one embodiment, at least two of the Q first-type time-frequency resource units are non-consecutive in time.

In one embodiment, the first time window lasts 1000 ms in time.

In one embodiment, the Q first-type time-frequency resource unit(s) comprises T time domain unit(s) in time domain, wherein T is a positive integer not greater than the Q.

In one embodiment, the Q first-type time-frequency resource unit(s) comprises W frequency domain unit(s) in time domain, wherein W is a positive integer not greater than the Q.

In one embodiment, the first time window overlaps with the second radio resource group in time domain.

In one embodiment, at least one of a positive integer number of time domain units comprised in the second radio resource group is located within the first time window.

In one embodiment, the first time window is orthogonal with the first radio resource group in time domain.

In one embodiment, the Q first-type time-frequency resource unit(s) overlaps(overlap) with the second radio resource group.

In one embodiment, a second time-frequency resource unit is one of the Q first-type time-frequency resource unit(s).

In one embodiment, a third time-frequency resource unit is a time-frequency resource unit in the first candidate resource pool, a start time of the third time-frequency resource unit is behind a deadline of the first time window, the third time-frequency resource unit corresponds to the second time-frequency resource unit.

In one embodiment, the third time-frequency resource unit is outside the first time window.

In one embodiment, the phrase that "the third time-frequency resource unit corresponds to the second time-frequency resource unit" means that the third time-frequency resource unit and the second time-frequency resource unit occupy a same frequency domain unit(s).

In one embodiment, the phrase that "the third time-frequency resource unit corresponds to the second time-frequency resource unit" means that time domain units occupied by the third time-frequency resource units and time domain units occupied by the second time-frequency resource unit are spaced by a given time domain offset.

In one embodiment, the given time domain offset comprises a positive integer number of time domain unit(s).

In one embodiment, the phrase that "the third time-frequency resource unit corresponds to the second time-frequency resource unit" means that frequency domain units occupied by the third time-frequency resource units and frequency domain units occupied by the second time-frequency resource unit are spaced by a given frequency domain offset.

In one embodiment, the given time domain offset comprises a positive integer number of frequency domain unit(s).

In one embodiment, the phrase that "the third time-frequency resource unit corresponds to the second time-frequency resource unit" means that time domain units occupied by the third time-frequency resource units and time domain units occupied by the second time-frequency resource unit are spaced by a given time domain offset; frequency domain units occupied by the third time-frequency resource units and frequency domain units occupied by the second time-frequency resource unit are spaced by a given frequency domain offset.

In one embodiment, the second radio resource group does not comprise the Q first-type time-frequency resource unit(s).

In one embodiment, a first signal is one of the Q first-type signal(s), the first signal is transmitted in the second time-frequency resource unit.

In one embodiment, a result of detection on the first signal is lower than the first threshold, the target resource pool comprises the third time-frequency resource unit.

In one embodiment, a result of detection on the first signal is higher than the first threshold, the target resource pool does not comprise the third time-frequency resource unit.

In one embodiment, a result of detection on the first signal is equal to the first threshold, the target resource pool comprises the third time-frequency resource unit.

In one embodiment, a result of detection on the first signal is equal to the first threshold, the target resource pool comprises the third time-frequency resource unit.

In one embodiment, a result of detection on the Q first-type signal(s) is lower than the first threshold, the target resource pool comprises the third time-frequency resource unit.

In one embodiment, a result of detection on the Q first-type signal(s) is higher than the first threshold, the target resource pool does not comprise the third time-frequency resource unit.

In one embodiment, a result of detection on the Q first-type signal(s) is equal to the first threshold, the target resource pool comprises the third time-frequency resource unit.

In one embodiment, a result of detection on the Q first-type signal(s) is equal to the first threshold, the target resource pool comprises the third time-frequency resource unit.

In one embodiment, the second radio resource group overlaps with the Q first-type time-frequency resource unit(s), the second radio resource group comprises the second time-frequency resource unit and the third time-frequency resource unit; the first radio resource group comprises the second time-frequency resource unit, but does not comprise the third time-frequency resource unit.

In one embodiment, a result of detection on the first signal is lower than the first threshold, the target resource pool comprises the third time-frequency resource unit.

In one embodiment, a result of detection on the first signal is higher than the first threshold, the second priority is higher than the first priority, the target resource pool comprises the third time-frequency resource unit.

In one embodiment, a result of detection on the first signal is higher than the first threshold, the second priority is lower than the first priority, the target resource pool does not comprise the third time-frequency resource unit.

In one embodiment, a result of detection on the first signal is equal to the first threshold, the second priority is higher than the first priority, the target resource pool comprises the third time-frequency resource unit.

In one embodiment, a result of detection on the first signal is equal to the first threshold, the second priority is lower than the first priority, the target resource pool does not comprise the third time-frequency resource unit.

In one embodiment, a result of detection on the first signal is higher than the first threshold, the second priority is equal to the first priority, the target resource pool comprises the third time-frequency resource unit.

In one embodiment, a result of detection on the first signal is higher than the first threshold, the second priority is equal to the first priority, the target resource pool does not comprise the third time-frequency resource unit.

In one embodiment, the second radio resource group comprises the Q first-type time-frequency resource unit(s), the first radio resource group comprises the third time-frequency resource unit, but does not comprise the second time-frequency resource unit.

In one embodiment, a result of detection on the Q first-type signal(s) is lower than the first threshold, the target resource pool comprises the third time-frequency resource unit.

In one embodiment, a result of detection on the Q first-type signal(s) is higher than the first threshold, the second priority is higher than the first priority, the target resource pool comprises the third time-frequency resource unit.

In one embodiment, a result of detection on the Q first-type signal(s) is higher than the first threshold, the second priority is lower than the first priority, the target resource pool does not comprise the third time-frequency resource unit.

In one embodiment, a result of detection on the Q first-type signal(s) is equal to the first threshold, the second priority is higher than the first priority, the target resource pool comprises the third time-frequency resource unit.

In one embodiment, a result of detection on the Q first-type signal(s) is equal to the first threshold, the second priority is lower than the first priority, the target resource pool does not comprise the third time-frequency resource unit.

In one embodiment, a result of detection on the Q first-type signal(s) is higher than the first threshold, the second priority is equal to the first priority, the target resource pool comprises the third time-frequency resource unit.

In one embodiment, a result of detection on the Q first-type signal(s) is higher than the first threshold, the second priority is equal to the first priority, the target resource pool does not comprise the third time-frequency resource unit.

In one embodiment, a result of detection on the first signal comprises the channel quality of the first signal.

In one embodiment, a result of detection on the first signal comprises the RSRP of the first signal.

In one embodiment, a result of detection on the first signal comprises energy detection of the DMRS of the first signal.

In one embodiment, a result of detection on the first signal comprises a result of CRC check after the decoding of the first signal.

In one embodiment, a result of detection on the Q first-type signal(s) comprises a linear average RSRP value of each first-type signal of the Q first-type signal(s).

In one embodiment, a result of detection on the Q first-type signal(s) comprises a linear filtering of an RSRP of each first-type signal of the Q first-type signal(s).

Embodiment 9

Figure 9:
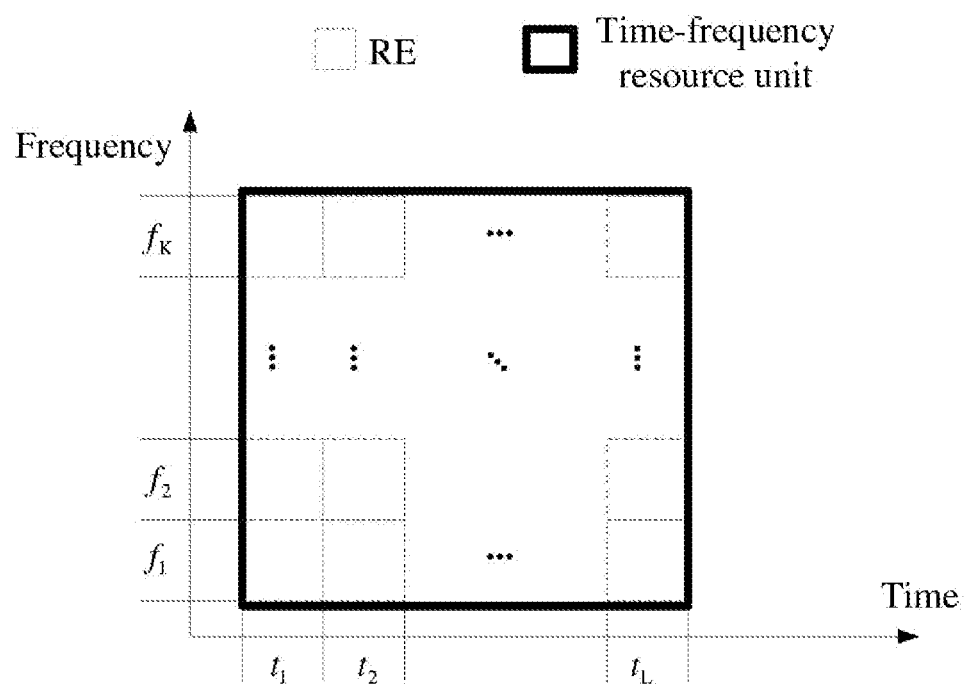
FIG. 9 illustrates a schematic diagram of a time-frequency resource unit according to one embodiment of the present disclosure.

Embodiment 9 illustrates a schematic diagram of a time-frequency resource unit according to one embodiment of the present disclosure, as shown in FIG. 9. In FIG. 9, a box framed with dotted lines represents a Resource Element (RE), a thick lined box represents a time-frequency resource unit. In FIG. 9, a time-frequency resource unit occupies K subcarriers in frequency domain, and occupies L multicarrier symbols in time domain; K and L are both positive integers. In FIG. 9, t1, t2, . . . and tL respectively the L multicarrier symbols, while f1, f2, . . . and fK respectively represent the K subcarriers.

In Embodiment 8, a time-frequency resource unit occupies K subcarriers in frequency domain, and occupies L multicarrier symbols in time domain; K and L are both positive integers.

In one embodiment, the K is equal to 12.
In one embodiment, the K is equal to 72.
In one embodiment, the K is equal to 127.
In one embodiment, the K is equal to 240.
In one embodiment, the L is equal to 1.
In one embodiment, the L is equal to 2.
In one embodiment, the L is no greater than 14.

In one embodiment, any of the L multicarrier symbols at least is one of a Frequency Division Multiple Access (FDMA) symbol, an Orthogonal Frequency Division Multiplexing (OFDM) symbol, a Single-Carrier Frequency Division Multiple Access (SC-FDMA) symbol, a Discrete Fourier Transform Spread Orthogonal Frequency Division Multiplexing (DFTS-OFDM) symbol, a Filter Bank Multi-Carrier (FBMC) symbol, or an Interleaved Frequency Division Multiple Access (IFDMA) symbol.

In one embodiment, one of the X1 time domain units comprises a positive integer number of radio frame(s).

In one embodiment, one of the X1 time domain units is a radio frame.

In one embodiment, one of the X1 time domain units comprises a positive integer number of subframes.

In one embodiment, one of the X1 time domain units is a subframe.

In one embodiment, one of the X1 time domain units comprises a positive integer number of slots.

In one embodiment, one of the X1 time domain units is a slot.

In one embodiment, one of the X1 time domain units comprises a positive integer number of multicarrier symbols.

In one embodiment, one of the X1 time domain units is a multicarrier symbol.

In one embodiment, one of the X2 time domain units comprises a positive integer number of radio frames.

In one embodiment, one of the X2 time domain units is a radio frame.

In one embodiment, one of the X2 time domain units comprises a positive integer number of subframes.

In one embodiment, one of the X2 time domain units is a subframe.

In one embodiment, one of the X2 time domain units comprises a positive integer number of slots.

In one embodiment, one of the X2 time domain units is a slot.

In one embodiment, one of the X2 time domain units comprises a positive integer number of multicarrier symbols.

In one embodiment, one of the X2 time domain units is a multicarrier symbol.

In one embodiment, one of the Y1 frequency domain units comprises a positive integer number of carriers.

In one embodiment, one of the Y1 frequency domain units is a carrier.

In one embodiment, one of the Y1 frequency domain units comprises a positive integer number of BWPs.

In one embodiment, one of the Y1 frequency domain units is a BWP.

In one embodiment, one of the Y1 frequency domain units comprises a positive integer number of subchannels.

In one embodiment, one of the Y1 frequency domain units is a subchannel.

In one embodiment, the subchannel comprises a positive integer number of RBs.

In one embodiment, the number of RBs comprised in the subchannel is variable.

In one embodiment, the RB comprises a positive integer number of subcarriers in frequency domain.

In one embodiment, the RB comprises 12 subcarriers in frequency domain.

In one embodiment, the subchannel comprises a positive integer number of PRBs.

In one embodiment, the number of PRBs comprised in the subchannel is variable.

In one embodiment, the PRB comprises a positive integer number of subcarriers in frequency domain.

In one embodiment, the PRB comprises 12 subcarriers in frequency domain.

In one embodiment, one of the Y1 frequency domain units comprises a positive integer number of RBs.

In one embodiment, one of the Y1 frequency domain units is an RB.

In one embodiment, one of the Y1 frequency domain units comprises a positive integer number of PRBs.

In one embodiment, one of the Y1 frequency domain units is a PRB.

In one embodiment, one of the Y1 frequency domain units comprises a positive integer number of subcarriers.

In one embodiment, one of the Y1 frequency domain units is a subcarrier.

In one embodiment, one of the Y2 frequency domain units comprises a positive integer number of carriers.

In one embodiment, one of the Y2 frequency domain units is a carrier.

In one embodiment, one of the Y2 frequency domain units comprises a positive integer number of BWPs.

In one embodiment, one of the Y2 frequency domain units is a BWP.

In one embodiment, one of the Y2 frequency domain units comprises a positive integer number of subchannels.

In one embodiment, one of the Y2 frequency domain units is a subchannel.

In one embodiment, one of the Y2 frequency domain units comprises a positive integer number of RBs.

In one embodiment, one of the Y2 frequency domain units is an RB.

In one embodiment, one of the Y2 frequency domain units comprises a positive integer number of PRBs.

In one embodiment, one of the Y2 frequency domain units is a PRB.

In one embodiment, one of the Y2 frequency domain units comprises a positive integer number of subcarriers.

In one embodiment, one of the Y2 frequency domain units is a subcarrier.

In one embodiment, the time-frequency resource unit comprises R REs, the R is a positive integer.

In one embodiment, the time-frequency resource unit is composed of R REs, the R is a positive integer.

In one embodiment, any of the R REs occupies a multicarrier symbol in time domain, and occupies a subcarrier in frequency domain.

In one embodiment, the subcarrier spacing of the RE is measured in Hz.

In one embodiment, the subcarrier spacing of the RE is measured in kHz.

In one embodiment, the subcarrier spacing of the RE is measured in MHz.

In one embodiment, the symbol length of multicarrier symbols occupied by the RE is measured by sampling spots.

In one embodiment, the symbol length of multicarrier symbols occupied by the RE is measured in μs.

In one embodiment, the symbol length of multicarrier symbols occupied by the RE is measured in ms.

In one embodiment, the subcarrier spacing of the RE is at least one of 1.25 kHz, 2.5 kHz, 5 kHz, 15 kHz, 30 kHz, 60 kHz, 120 kHz and 240 kHz.

In one embodiment, a product of the K and the L is not less than the R.

In one embodiment, the time-frequency resource unit does not comprise REs allocated for Guard Period (GP).

In one embodiment, the time-frequency resource unit does not comprise REs allocated for a Reference Signal (RS).

In one embodiment, the time-frequency resource unit does not comprise any RE allocated to the first-type signal in the present disclosure.

In one embodiment, the time-frequency resource unit does not comprise any RE allocated to the first-type channel in the present disclosure.

In one embodiment, the time-frequency resource unit does not comprise any RE allocated to the second-type signal in the present disclosure.

In one embodiment, the time-frequency resource unit does not comprise any RE allocated to the second-type channel in the present disclosure.

In one embodiment, the time-frequency resource unit comprises a positive integer number of RBs.

In one embodiment, the time-frequency resource unit belongs to an RB.

In one embodiment, the time-frequency resource unit is equal to an RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises a positive integer number of PRBs.

In one embodiment, the time-frequency resource unit belongs to a PRB.

In one embodiment, the time-frequency resource unit is equal to a PRB in frequency domain.

In one embodiment, the time-frequency resource unit comprises a positive integer number of Virtual Resource Block (VRB).

In one embodiment, the time-frequency resource unit belongs to a VRB.

In one embodiment, the time-frequency resource unit is equal to a VRB in frequency domain.

In one embodiment, the time-frequency resource unit comprises a positive integer number of PRB pairs.

In one embodiment, the time-frequency resource unit belongs to a PRB pair.

In one embodiment, the time-frequency resource unit is equal to a PRB pair in frequency domain.

In one embodiment, the time-frequency resource unit comprises a positive integer number of radio frames.

In one embodiment, the time-frequency resource unit belongs to a radio frame.

In one embodiment, the time-frequency resource unit is equal to a radio frame in time domain.

In one embodiment, the time-frequency resource unit comprises a positive integer number of subframes.

In one embodiment, the time-frequency resource unit belongs to a subframe.

In one embodiment, the time-frequency resource unit is equal to a subframe in time domain.

In one embodiment, the time-frequency resource unit comprises a positive integer number of slots.

In one embodiment, the time-frequency resource unit belongs to a slot.

In one embodiment, the time-frequency resource unit is equal to a slot in time domain.

In one embodiment, the time-frequency resource unit comprises a positive integer number of symbols.

In one embodiment, the time-frequency resource unit belongs to a symbol.

In one embodiment, the time-frequency resource unit is equal to a symbol in time domain.

In one embodiment, the time-frequency resource unit belongs to the third-type signals of the present disclosure.

In one embodiment, the time-frequency resource unit belongs to the third-type channels of the present disclosure.

In one embodiment, time duration of the time domain unit in the present disclosure is equal to time duration of time domain resources occupied by the time-frequency resource unit in the present disclosure.

Embodiment 10

Figure 10:
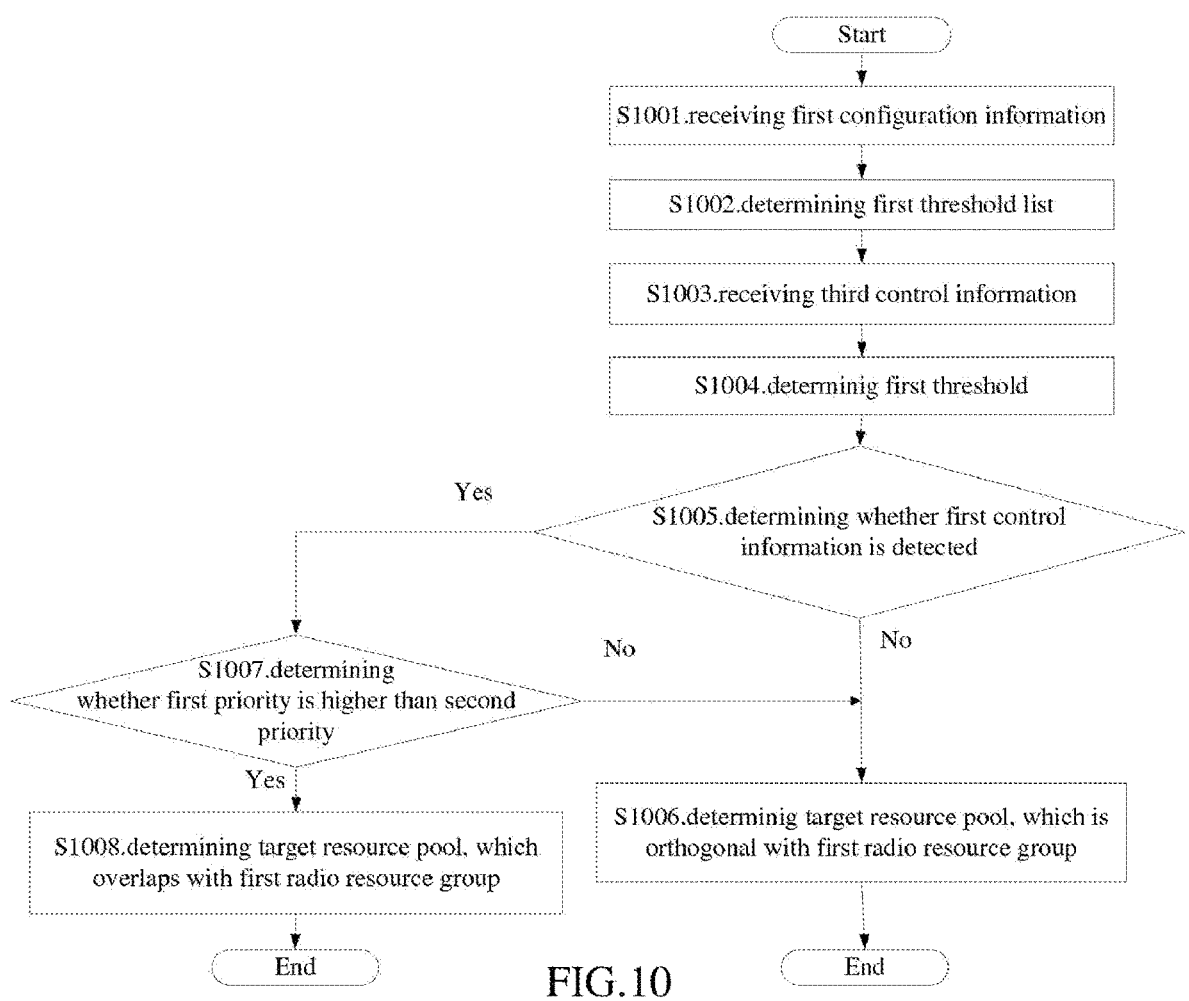
FIG. 10 illustrates a flowchart of determining a target resource pool according to one embodiment of the present disclosure.

Embodiment 10 illustrates a flowchart of determining a target resource pool according to one embodiment of the present disclosure, as shown in FIG. 10. In FIG. 10, first configuration information is received in step S1001; a first threshold list is determined in step S1002; third control information is received in step S1003; a first threshold is determined in step S1004; whether first control information is detected is determined in step S1005; if no, then a target resource pool is determined in step S1006, the target resource pool being orthogonal with a first radio resource group; if yes, then whether a first priority is higher than a second priority is determined in step S1007; if no, move back to step S1006; if yes, a target resource pool is determined in step S1008, the target resource pool overlapping with a first radio resource group;

In Embodiment 10, the first configuration information comprises the first threshold list, the first threshold list comprises a positive integer number of first-type thresholds; the third control information comprises a first reference priority, the first reference priority is used for determining a first threshold; the first control information is used for indicating a first priority.

In one embodiment, the first threshold list is pre-configured.

In one embodiment, the first threshold list is pre-defined, i.e., there is no need for signaling indication.

In one embodiment, the first threshold list comprises 64 first-type thresholds.

In one embodiment, the first threshold list comprises a positive integer number of power values.

In one embodiment, the first threshold list comprises a positive integer number of energy values.

In one embodiment, any of the positive integer number of first-type thresholds is measured in dB.

In one embodiment, any of the positive integer number of first-type thresholds is measured in dBm.

In one embodiment, the phrase that the first control information is detected means that: if the decoding is correct based on the CRC bit, then it is determined that the first control information is detected in the first time window; if the decoding is incorrect based on the CRC bit, then it is determined that the first control information is not detected in the first time window.

In one embodiment, the phrase that the first control information is detected means that if the energy of a signal obtained after the coherent reception is greater than a first given threshold, then it is determined that the first control information is detected in the first time window; if the energy of a signal obtained after the coherent reception is not greater than a first given threshold, then it is determined that the first control information is not detected in the first time window In one embodiment, the phrase that the first control information is detected means that if the received energy is greater than a second given threshold, then it is determined that the first control information is detected in the first time window; if the received energy is not greater than a second given threshold, then it is determined that the first control information is not detected in the first time window Embodiment 11

Figure 11:
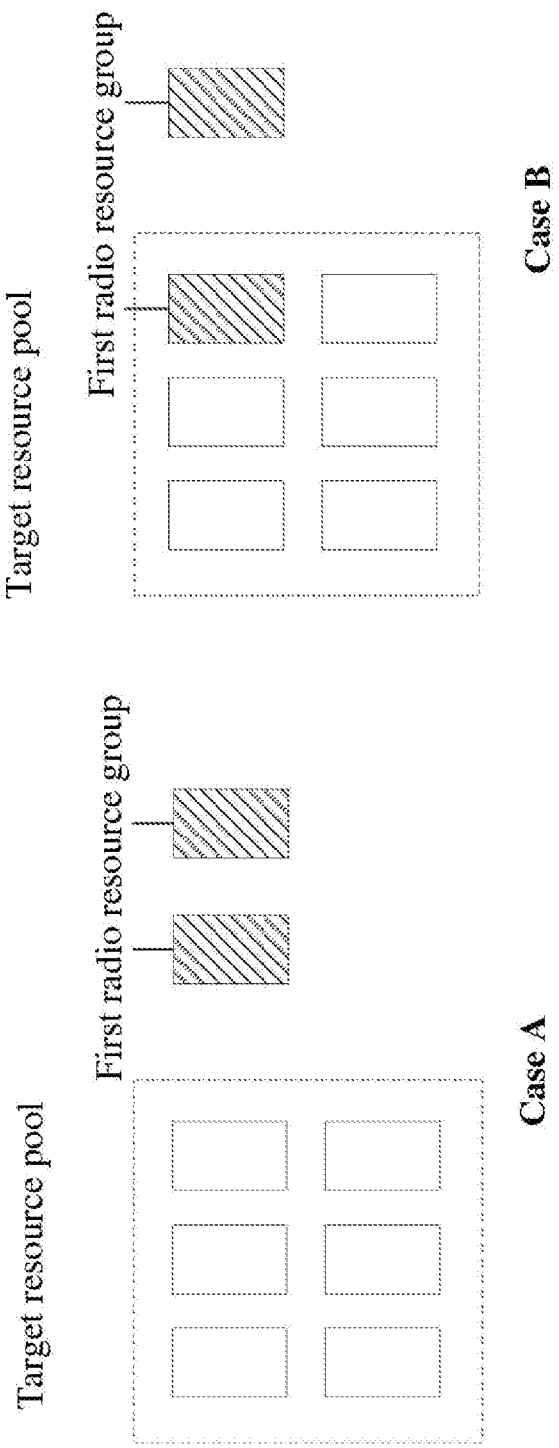
FIG. 11 illustrates a schematic diagram of a relation between a target resource pool and a first radio resource group according to one embodiment of the present disclosure.

Embodiment 11 illustrates a schematic diagram of a relation between a target resource pool and a first radio resource group according to one embodiment of the present disclosure, as shown in FIG. 11. In FIG. 11, the box framed with dotted lines represents the target resource pool of the present disclosure; the blank boxes framed with solid lines represent time-frequency resource units comprised in the target resource pool; and slash-filled boxes framed with solid lines represent time-frequency resource units comprised in the first radio resource group of the present disclosure.

In Embodiment 11, if the second priority is lower than the first priority, the target resource pool is orthogonal with the first radio resource group; if the second priority is higher than the first priority, the target resource pool overlaps with the first radio resource group.

In one embodiment, the phrase that the second priority is higher than the first priority means that: the priority of services carried by the first radio signal is higher than the priority of services carried by a radio signal to be transmitted by a transmitter of the first control information in the first radio resource group.

In one embodiment, the phrase that the second priority is higher than the first priority means that: the latency requirement of services carried by the first radio signal is higher than the latency requirement of services carried by a radio signal to be transmitted by a transmitter of the first control information in the first radio resource group.

In one embodiment, the phrase that the second priority is higher than the first priority means that: a transmitter of the first control information will not transmit a radio signal in the first radio resource group.

In one embodiment, the phrase that the second priority is higher than the first priority means that: a transmitter of the first control information allows the first node to transmit a radio signal in the first radio resource group.

In one embodiment, the phrase that the second priority is higher than the first priority means that: a second-type threshold corresponding to the second priority is higher than a first-type threshold corresponding to the first priority.

In one embodiment, the phrase that the second priority is higher than the first priority means that: the first control signal comprises an ID of the first node.

In one embodiment, the phrase that the second priority is lower than the first priority means that: the priority of services carried by the first radio signal is lower than the priority of services carried by a radio signal to be transmitted by a transmitter of the first control information in the first radio resource.

In one embodiment, the phrase that the second priority is lower than the first priority means that: the latency requirement of services carried by the first radio signal is lower than the latency requirement of services carried by a radio signal to be transmitted by a transmitter of the first control information in the first radio resource group.

In one embodiment, the phrase that the second priority is lower than the first priority means that: a transmitter of the first control information does not allow the first node to transmit a radio signal in the first radio resource group.

In one embodiment, the phrase that the second priority is lower than the first priority means that: a second-type threshold corresponding to the second priority is lower than a first-type threshold corresponding to the first priority.

In one embodiment, the phrase that the second priority is lower than the first priority means that: the first control signal does not comprise an ID of the first node.

In one embodiment, if the second priority is equal to the first priority, the target resource pool overlaps with the first radio resource group.

In one embodiment, the phrase that the second priority is equal to the first priority means that: the priority of services carried by the first radio signal is equal to the priority of services carried by a radio signal to be transmitted by a transmitter of the first control information in the first radio resource group.

In one embodiment, the phrase that the second priority is equal to the first priority means that: the latency requirement of services carried by the first radio signal is equal to the latency requirement of services carried by a radio signal to be transmitted by a transmitter of the first control information in the first radio resource group.

In one embodiment, the phrase that the second priority is equal to the first priority means that: a transmitter of the first control information allows the first node to transmit a radio signal in the first radio resource group.

In one embodiment, the phrase that the second priority is equal to the first priority means that: a second-type threshold corresponding to the second priority is equal to a first-type threshold corresponding to the first priority.

In one embodiment, the phrase that the second priority is equal to the first priority means that: the first control signal comprises an ID of the first node.

In one embodiment, any time-frequency resource unit in the target resource pool is not overlapping with any time-frequency resource unit in the first radio resource group.

In one embodiment, a first candidate time-frequency resource unit is any of Z4 time-frequency resource units comprised in the target resource pool.

In one embodiment, the first candidate time-frequency resource unit overlaps with any time-frequency resource unit of the first radio resource group in time domain and in frequency domain at different times.

In one embodiment, the target resource pool comprises the first radio resource group.

In one embodiment, the target resource pool comprises part of time-frequency resource units of the first radio resource group.

In one embodiment, a fourth time-frequency resource unit is a time-frequency resource unit out of the first radio resource group, the target resource pool comprises the fourth time-frequency resource unit.

In one embodiment, the fourth time-frequency resource unit overlaps with the target resource pool in time domain and frequency domain simultaneously.

Embodiment 12

Figure 12:
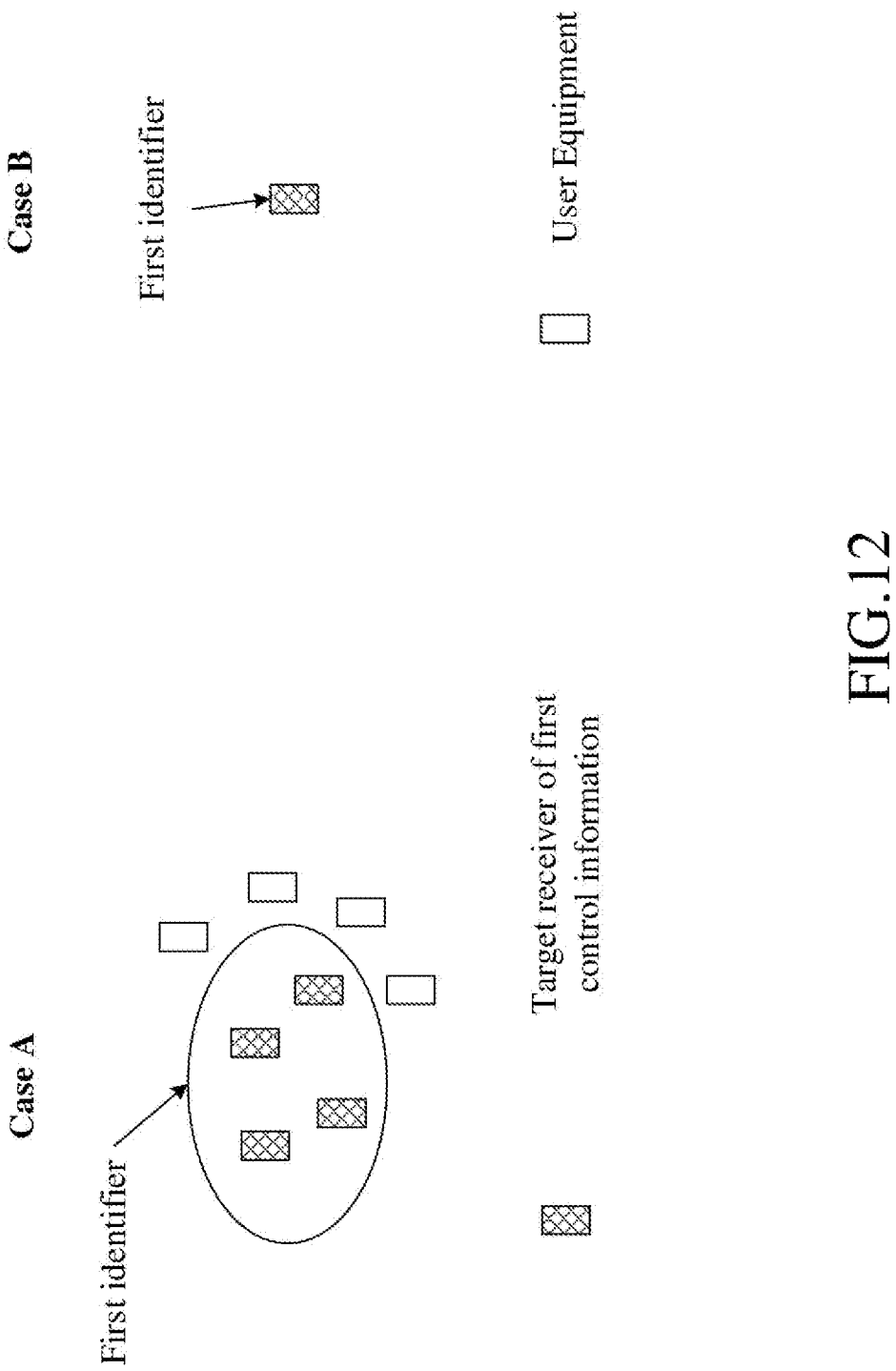
FIG. 12 illustrates a schematic diagram of relation(s) between a first identifier and target receiver(s) of first control information according to one embodiment of the present disclosure.

Embodiment 12 illustrates a schematic diagram of relation(s) between a first identifier and target receiver(s) of first control information according to one embodiment of the present disclosure, as shown in FIG. 12. In FIG. 12, each rectangular box represents a UE, each cross-filled rectangular box represents that a UE is a target receiver of first control information, each blank rectangular box represents that a UE is not a target receiver of first control information; in Case A, target receivers of the first control information include multiple UEs; in Case B, a target receiver of the first control information only includes a UE.

In Embodiment 12, the first control information comprises a first identifier, the first identifier is used for determining a positive integer number of target receivers of the first control information.

In one embodiment, the first identifier is one of N1 first-type candidate IDs; N1 is a positive integer.

In one embodiment, the N1 is no greater than the 16th power of 2.

In one embodiment, the N1 is no greater than the 40th power of 2.

In one embodiment, the N1 is no greater than the 48th power of 2.

In one embodiment, the first identifier is a non-negative integer.

In one embodiment, the first identifier is B1 binary bits, B1 is a positive integer.

In one embodiment, the B1 binary bits corresponds to one of the N1 first-type candidate IDs; the B1th power of 2 is no less than the N1.

In one embodiment, the B1 is equal to 16.

In one embodiment, the B1 is equal to 40.

In one embodiment, the B1 is equal to 48.

In one embodiment, the first identifier is UE-specific.

In one embodiment, the first identifier is UE group-specific, wherein the UE group comprises a positive integer number of UEs.

In one embodiment, the first identifier is an RNTI.

In one embodiment, the first identifier is a C-RNTI.

In one embodiment, the first identifier is a Temporary Cell-RNTI (TC-RNTI).

In one embodiment, the first identifier is an International Mobile Subscriber Identifier (IMSI).

In one embodiment, the first identifier is an International Mobile Equipment Identifier (IMEI).

In one embodiment, the first identifier is a Temporary Mobile Station Identifier (TMSI).

In one embodiment, the first identifier is a System Architecture Evolution-TMSI (S-TMSI).

In one embodiment, the first identifier is a Local Mobile Station Identifier (LMSI).

In one embodiment, the first identifier is a Globally Unique Temporary User Equipment Identifier (GUTI).

In one embodiment, the first identifier is configured by an RRC layer signaling.

In one embodiment, the first identifier is configured by a MAC layer signaling.

In one embodiment, the first identifier is configured by a DCI signaling.

In one embodiment, the first identifier is configured semi-statically.

In one embodiment, the first identifier is configured dynamically.

In one embodiment, the first control information explicitly indicates the first identifier.

In one embodiment, the first control information implicitly indicates the first identifier.

In one embodiment, target receivers of the first control information include a plurality of UEs, the first node is a UE among the target receivers of the first control information.

In one embodiment, target receiver of the first control information only includes one UE, the first node is the target receiver of the first control information.

In one embodiment, the first identifier is a sequence for identifying the first control information.

In one embodiment, the first identifier is used for generating a scrambling sequence for scrambling the first control signaling.

In one embodiment, the first identifier is used for generating the DMRS of the first control signaling.

Embodiment 13

Figure 13:
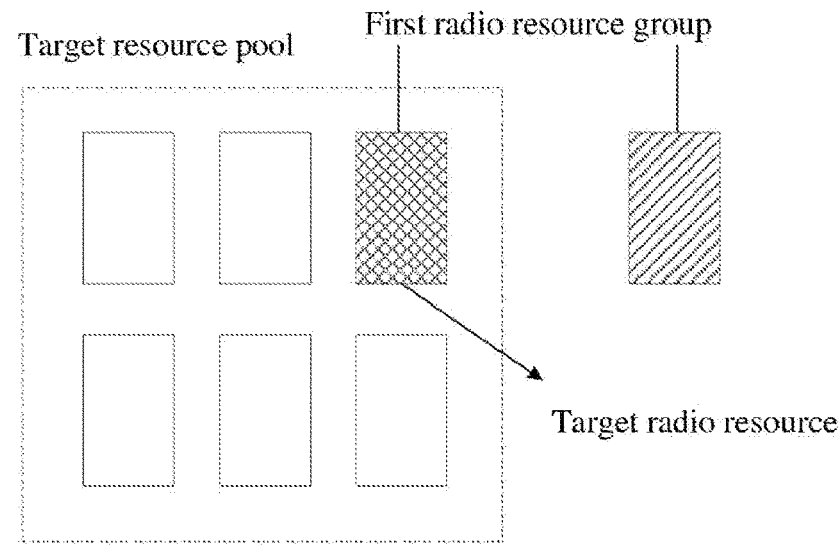
FIG. 13 illustrates a schematic diagram of relations between a target resource pool, a target radio resource and a first radio resource group according to one embodiment of the present disclosure.

Embodiment 13 illustrates a schematic diagram of relations between a target resource pool, a target radio resource and a first radio resource group according to one embodiment of the present disclosure, as shown in FIG. 13. In FIG. 13, a large dotted lined box represents the target resource pool of the present disclosure, a small box represents any time-frequency resource unit of the first candidate radio resource group; a slash-filled box framed with solid lines represents any time-frequency resource unit of the first radio resource group, and a cross-filled box framed with solid lines represents the target radio resource of the present disclosure.

In Embodiment 13, the fourth control information is transmitted; the second priority is higher than the first priority, the first radio resource group comprises the target radio resource.

In one embodiment, the fourth control information is transmitted via a radio signal.

In one embodiment, the fourth control information is transmitted via a PC5 interface.

In one embodiment, the fourth control information is transmitted through the third-type channel in the present disclosure.

In one embodiment, the fourth control information is transmitted through the second-type channel in the present disclosure.

In one embodiment, the fourth control information is transmitted via broadcast.

In one embodiment, the fourth control information is transmitted via groupcast.

In one embodiment, the fourth control information is transmitted via unicast.

In one embodiment, the fourth control information is cell-specific.

In one embodiment, the fourth control information is UE-specific.

In one embodiment, the fourth control information comprises all or part of a higher layer signaling.

In one embodiment, the fourth control information comprises all or part of an RRC layer signaling.

In one embodiment, the fourth control information comprises one or a plurality of fields of an RRC IE.

In one embodiment, the fourth control information comprises one or a plurality of fields of a SIB.

In one embodiment, the fourth control information comprises one or a plurality of fields of a piece of RMSI.

In one embodiment, the fourth control information comprises one or a plurality of fields of a piece of OSI.

In one embodiment, the fourth control information comprises all or part of a MAC layer signaling.

In one embodiment, the fourth control information comprises one or a plurality of fields of a MAC CE.

In one embodiment, the fourth control information comprises one or a plurality of of a PHY layer signaling.

In one embodiment, the fourth control information comprises one or a plurality of fields of a piece of SCI.

In one embodiment, the fourth control information comprises one or a plurality of fields of a SCI format.

In one embodiment, the fourth control information comprises one or a plurality of fields of a piece of UCI.

In one embodiment, the fourth control information is semi-statically configured.

In one embodiment, the fourth control information is dynamically configured.

In one embodiment, the fourth control information is used for indicating the second priority.

In one embodiment, the fourth control information is used for indicating the target radio resource.

In one embodiment, the fourth control information is used for indicating the second priority and the target radio resource.

In one embodiment, the fourth control information comprises the second priority.

In one embodiment, the fourth control information explicitly indicates the second priority.

In one embodiment, the fourth control information implicitly indicates the second priority.

In one embodiment, the second priority is used for generating a scrambling sequence for scrambling the fourth control information.

In one embodiment, the second priority is used for generating the DMRS of the fourth control information.

In one embodiment, the fourth control information explicitly indicates the target radio resource.

In one embodiment, the fourth control information implicitly indicates the target radio resource.

In one embodiment, the fourth control information indicates all time domain units comprised by the target radio resource.

In one embodiment, the fourth control information indicates a first time domain unit of the X5 time domain units comprised in the target radio resource.

In one embodiment, the fourth control information indicates a last time domain unit of the X5 time domain units comprised in the target radio resource.

In one embodiment, the fourth control information indicates an earliest time domain unit of the X5 time domain units comprised in the target radio resource.

In one embodiment, the fourth control information indicates a latest time domain unit of the X5 time domain units comprised in the target radio resource.

In one embodiment, the fourth control information indicates a first time domain unit of the X5 time domain units comprised in the target radio resource and a time interval of the X5 time domain units.

In one embodiment, the fourth control information indicates all frequency domain units comprised in the target radio resource.

In one embodiment, the fourth control information indicates a first frequency domain unit of the Y5 frequency domain units comprised in the target radio resource.

In one embodiment, the fourth control information indicates a last frequency domain unit of the Y5 frequency domain units comprised in the target radio resource.

In one embodiment, the fourth control information indicates a lowest frequency domain unit of the Y5 frequency domain units comprised in the target radio resource.

In one embodiment, the fourth control information indicates a highest frequency domain unit of the Y5 frequency domain units comprised in the target radio resource.

In one embodiment, the fourth control information indicates a first frequency domain unit of the Y5 frequency domain units comprised in the target radio resource and a frequency interval of the Y5 frequency domain units.

In one embodiment, the fourth control information comprises all time-frequency resource units comprised in the target radio resource.

In one embodiment, the fourth control information is used for indicating the target radio resource out of the target resource pool in the present disclosure.

In one embodiment, the fourth control information is used for indicating the target radio resource out of the first radio resource group in the present disclosure.

In one embodiment, the fourth control information is used for indicating the target radio resource out of the second radio resource group in the present disclosure.

In one embodiment, the fourth control information is used for indicating the target radio resource out of the first candidate resource pool in the present disclosure.

In one embodiment, the fourth control information comprises an index of the target radio resource in the first candidate resource pool.

In one embodiment, the fourth control information comprises an index of the target radio resource in the target resource pool.

In one embodiment, the fourth control information comprises an index of the target radio resource in the first radio resource group.

In one embodiment, the fourth control information comprises an index of the target radio resource in the second radio resource group.

In one embodiment, the fourth control information comprises an index of a first time domain unit of the X5 time domain units comprised by the target radio resource in the first radio resource group.

In one embodiment, the fourth control information comprises an index of a first time domain unit of the X5 time domain units comprised by the target radio resource in the first candidate resource pool.

In one embodiment, the fourth control information comprises an index of a first time domain unit of the X5 time domain units comprised by the target radio resource in the first radio resource group and a time interval of the X5 time domain units.

In one embodiment, the fourth control information comprises an index of a first time domain unit of the X5 time domain units comprised by the target radio resource in the first candidate resource pool and a time interval of the X5 time domain units.

In one embodiment, the fourth control information comprises a time offset between a first time domain unit of the target radio resource and a first time domain unit of the first candidate resource pool.

In one embodiment, the fourth control information comprises a time offset between a first time domain unit of the target radio resource and a first time domain unit of the first radio resource group.

In one embodiment, the fourth control information comprises a frequency offset between a first frequency domain unit of the target radio resource and a first frequency domain unit of the first candidate resource pool.

In one embodiment, the fourth control information comprises a frequency offset between a first frequency domain unit of the target radio resource and a first frequency domain unit of the first radio resource group.

In one embodiment, the fourth control information comprises a positive integer number of bits, the positive integer number of bits comprises in the fourth control information respectively correspond to X4 time domain units comprised in the target resource pool.

In one embodiment, the fourth control information comprises a positive integer number of bits, the positive integer number of bits comprises in the fourth control information respectively correspond to Y4 frequency domain units comprised in the target resource pool.

Embodiment 14

Figure 14:
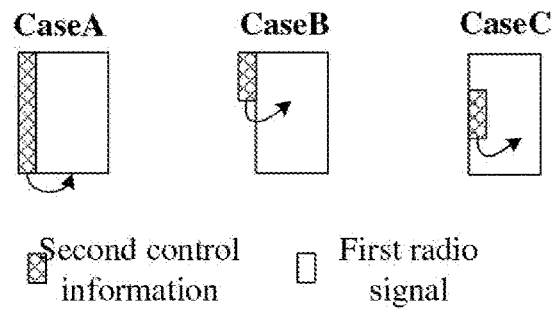
FIG. 14 illustrates a schematic diagram of a relation between second control information and a first radio signal according to one embodiment of the present disclosure.

Embodiment 14 illustrates a schematic diagram of a relation between second control information and a first radio signal according to one embodiment of the present disclosure, as shown in FIG. 14. In FIG. 14, the box filled with grids represents second control information, and the blank box represents a first radio signal.

In Embodiment 14, the second control information is used for indicating the target radio resource and the transmission format of the first radio signal. In Case A of Embodiment 14, the second control information and the first radio signal are time division multiplexed, the second control information and the first radio signal occupy same frequency domain resources; in Case B of Embodiment 14, the second control information and the first radio signal are time division multiplexed, the frequency domain resources occupied by the second control information are part of the frequency domain resources occupied by the first radio signal; in Case C of Embodiment 14, the second control information is time division multiplexed with part of the first radio signal and is frequency division multiplexed with the other part of the first radio signal, the time domain resources occupied by the second control information are part of the time domain resources occupied by the first radio signal, and the frequency domain resources occupied by the second control information are part of frequency domain resources occupied by the first radio signal.

In one embodiment, the second control information is not transmitted in the target radio resource.

In one embodiment, the second control information and the first radio signal are both transmitted in the target radio resource.

In one embodiment, the second control information is transmitted via a radio signal.

In one embodiment, the second control information is transmitted via a PC5 interface.

In one embodiment, the second control information is transmitted through the third-type channel in the present disclosure.

In one embodiment, the second control information is transmitted through the second-type channel in the present disclosure.

In one embodiment, the second control information is transmitted via broadcast.

In one embodiment, the second control information is transmitted via groupcast.

In one embodiment, the second control information is transmitted via unicast.

In one embodiment, the second control information is cell-specific.

In one embodiment, the second control information is UE-specific.

In one embodiment, the second control information comprises all or part of a higher layer signaling.

In one embodiment, the second control information comprises all or part of an RRC layer signaling.

In one embodiment, the second control information comprises one or a plurality of fields of an RRC IE.

In one embodiment, the second control information comprises one or a plurality of fields of a SIB.

In one embodiment, the second control information comprises one or a plurality of fields of a piece of RMSI.

In one embodiment, the second control information comprises one or a plurality of fields of a piece of OSI.

In one embodiment, the second control information comprises all or part of a MAC layer signaling.

In one embodiment, the second control information comprises one or a plurality of fields of a MAC CE.

In one embodiment, the second control information comprises one or a plurality of fields of a PHY layer signaling.

In one embodiment, the second control information comprises one or a plurality of fields of a piece of SCI.

In one embodiment, the second control information comprises one or a plurality of fields of an SCI format.

In one embodiment, the second control information comprises one or a plurality of fields of a piece of UCI.

In one embodiment, the second control information is semi-statically configured.

In one embodiment, the second control information is dynamically configured.

In one embodiment, the second control information is used for indicating the target radio resource.

In one embodiment, the second control information is used for indicating the transmission format of the first radio signal.

In one embodiment, the second control information is used for indicating the target radio resource and the transmission format of the first radio signal.

In one embodiment, the second control information comprises the transmission format of the first radio signal.

In one embodiment, the transmission format of the first radio signal comprises at least one of a Modulation and Coding Scheme (MCS), retransmission indication, or a time interval between an initial transmission and a retransmission.

In one embodiment, the transmission format of the first radio signal comprises a Modulation and Coding Scheme (MCS), retransmission indication, and a time interval between an initial transmission and a retransmission.

In one embodiment, the second control information explicitly indicates the target radio resource.

In one embodiment, the second control information implicitly indicates the target radio resource.

In one embodiment, the second control information indicates all time domain units comprised by the target radio resource.

In one embodiment, the second control information indicates a first time domain unit of the X5 time domain units comprised by the target radio resource.

In one embodiment, the second control information indicates a last time domain unit of the X5 time domain units comprised by the target radio resource.

In one embodiment, the second control information indicates an earliest time domain unit of the X5 time domain units comprised by the target radio resource.

In one embodiment, the second control information indicates a latest time domain unit of the X5 time domain units comprised by the target radio resource.

In one embodiment, the second control information indicates a first time domain unit of the X5 time domain units comprised by the target radio resource and a time interval of the X5 time domain units.

In one embodiment, the second control information indicates all frequency domain units comprised by the target radio resource.

In one embodiment, the second control information indicates a first frequency domain unit of the Y5 frequency domain units comprised by the target radio resource.

In one embodiment, the second control information indicates a last frequency domain unit of the Y5 frequency domain units comprised by the target radio resource.

In one embodiment, the second control information indicates a lowest frequency domain unit of the Y5 frequency domain units comprised by the target radio resource.

In one embodiment, the second control information indicates a highest frequency domain unit of the Y5 frequency domain units comprised by the target radio resource.

In one embodiment, the second control information indicates a first frequency domain unit of the Y5 frequency domain units comprised by the target radio resource and a frequency interval of the Y5 frequency domain units.

In one embodiment, the second control information comprises all time-frequency resource units comprised by the target radio resource.

In one embodiment, the second control information is used for indicating the target radio resource out of the target resource pool in the present disclosure.

In one embodiment, the second control information is used for indicating the target radio resource out of the first candidate resource pool in the present disclosure.

In one embodiment, the second control information comprises an index of the target radio resource in the first candidate resource pool.

In one embodiment, the second control information comprises an index of the target radio resource in the target resource pool.

In one embodiment, the second control information comprises an index of a first time domain unit of the X5 time domain units comprised by the target radio resource in the target resource pool.

In one embodiment, the second control information comprises an index of a first time domain unit of the X5 time domain units comprised by the target radio resource in the first candidate resource pool.

In one embodiment, the second control information comprises an index of a first time domain unit of the X5 time domain units comprised by the target radio resource in the target resource pool and a time interval of the X5 time domain units.

In one embodiment, the second control information comprises an index of a first time domain unit of the X5 time domain units comprised by the target radio resource in the first candidate resource pool and a time interval of the X5 time domain units.

In one embodiment, the second control information comprises a time offset between a first time domain unit of the target radio resource and a first time domain unit of the first candidate resource pool.

In one embodiment, the second control information comprises a time offset between a first time domain unit of the target radio resource and a first time domain unit of the target resource pool.

In one embodiment, the second control information comprises a frequency offset between a first frequency domain unit of the target radio resource and a first frequency domain unit of the first candidate resource pool.

In one embodiment, the second control information comprises a frequency offset between a first frequency domain unit of the target radio resource and a first frequency domain unit of the target resource pool.

In one embodiment, the second control information comprises a positive integer number of bits, the positive integer number of bits comprised by the second control information respectively correspond to X4 time domain units comprised by the target resource pool.

In one embodiment, the second control information comprises a positive integer number of bits, the positive integer number of bits comprised by the second control information respectively correspond to Y4 frequency domain units comprised by the target resource pool.

In one embodiment, the second control information comprises uplink/downlink subframe configuration.

In one embodiment, the second control information comprises uplink/downlink slot configuration.

In one embodiment, the second control information comprises uplink/downlink symbol configuration.

In one embodiment, the second control information indicates slot formats.

In one embodiment, the second control information comprises a Radio Frame Number of a radio frame corresponding to one of the X5 time domain units comprised by the target radio resource.

In one embodiment, the second control information comprises a Subframe Number of a subframe corresponding to one of the X5 time domain units comprised by the target radio resource.

In one embodiment, the second control information comprises a Slot Number of a slot corresponding to one of the X5 time domain units comprised by the target radio resource.

In one embodiment, the second control information comprises a carrier number of a carrier corresponding to one of the Y5 frequency domain units comprised by the target radio resource.

In one embodiment, the second control information comprises a BWP number of a BWP corresponding to one of the Y5 frequency domain units comprised by the target radio resource.

In one embodiment, the second control information comprises a subchannel number of a subchannel corresponding to one of the Y5 frequency domain units comprised by the target radio resource.

In one embodiment, the second control information comprises an RB number of an RB corresponding to one of the Y5 frequency domain units comprised by the target radio resource.

In one embodiment, the second control information comprises a PRB number of a PRB corresponding to one of the Y5 frequency domain units comprised by the target radio resource.

In one embodiment, the second control information comprises a smallest index of indices of a positive integer number of subchannels comprised by one of the Y5 frequency domain units of the target radio resource in frequency domain.

In one embodiment, the second control information comprises a smallest index of indices of a positive integer number of PRBs comprised by one of the Y5 frequency domain units of the target radio resource in frequency domain.

In one embodiment, the second control information indicates a number of subchannels comprised by one of the Y5 frequency domain units of the target radio resource in frequency domain.

In one embodiment, the second control information indicates a number of PRBs comprised by one of the Y5 frequency domain units of the target radio resource in frequency domain.

In one embodiment, the second control information indicates the center frequency and bandwidth corresponding to one of the Y5 frequency domain units of the target radio resource in frequency domain.

In one embodiment, the second control information indicates a lowest frequency and a highest frequency of the target radio resource in frequency domain.

In one embodiment, the second control information indicates a lowest frequency and bandwidth of the target radio resource when occupying frequency domain resources.

In one embodiment, the second control information indicates an earliest time for time domain resources corresponding to the target radio resource.

In one embodiment, the second control information indicates a latest time for time domain resources corresponding to the target radio resource.

In one embodiment, the second control information indicates an earliest time for and the length of time domain resources corresponding to the target radio resource.

Embodiment 15

Figure 15:
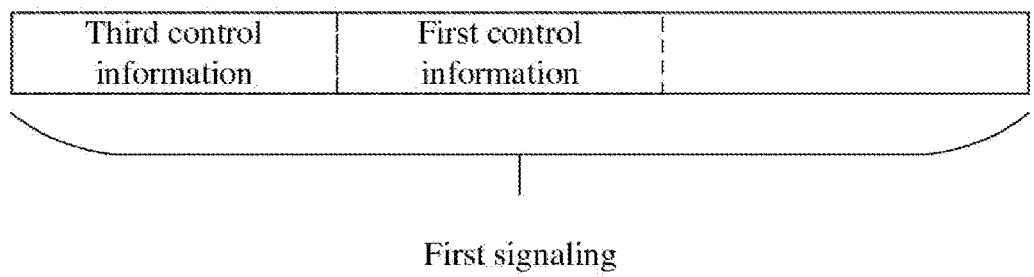
FIG. 15 illustrates a schematic diagram of a relation between first control information and third control information according to one embodiment of the present disclosure.

Embodiment 15 illustrates a schematic diagram of a relation between first control information and third control information according to one embodiment of the present disclosure, as shown in FIG. 15. In FIG. 15, the large solid box represents a first signaling, while the two dotted lined boxes respectively represent first control information and third control information of the present disclosure.

In Embodiment 15, the first control information and the third control information are respectively two fields of the first signaling.

In one embodiment, the first signaling is semi-statically configured.

In one embodiment, the first signaling is dynamically configured.

In one embodiment, the first signaling is transmitted via a higher layer signaling.

In one embodiment, the first signaling is transmitted via an RRC signaling.

In one embodiment, the first signaling is transmitted via a PHY layer signaling.

In one embodiment, the first signaling is transmitted via a SCI signaling.

In one embodiment, the first signaling is the third-type signal.

In one embodiment, the first signaling is transmitted through the third-type channel.

In one embodiment, the first control information and the third control information are two different IEs of a same RRC signaling.

In one embodiment, the first control information and the third control information are two different fields of a same IE of a same RRC signaling.

In one embodiment, the first control information and the third control information are two different CEs of a same MAC signaling.

In one embodiment, the Q piece(s) of first-type information are two different fields of a same piece of SCI.

Embodiment 16

Figure 16:
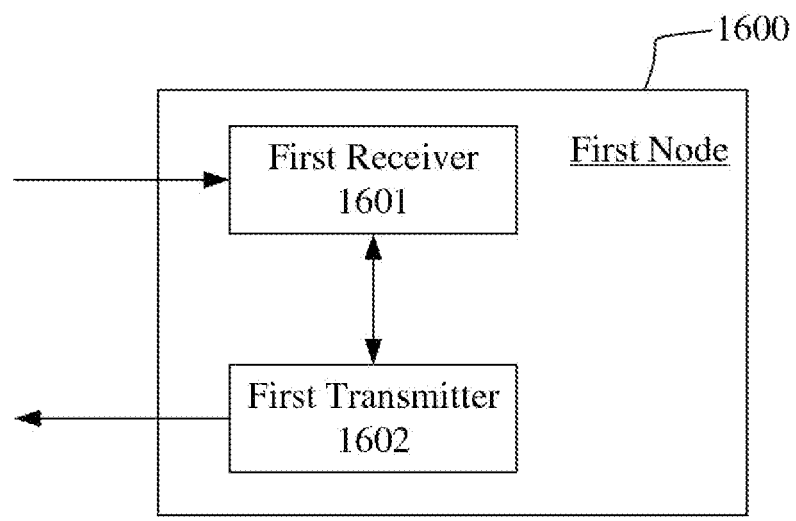
FIG. 16 illustrates a structure block diagram of a processing device in a first node according to one embodiment of the present disclosure.

Embodiment 16 illustrates a structure block diagram of a processing device in a first node, as shown in FIG. 16. In Embodiment 16, a first node processing device 1600 mainly consists of a first receiver 1601 and a first transmitter 1602.

In one embodiment, the first receiver 1601 comprises at least one of an antenna 452, a transmitter/receiver 454, a multi-antenna receiving processor 458, a receiving processor 456, a controller/processor 459, a memory 460 or a data source 467 in FIG. 4 of the present disclosure.

In one embodiment, the first transmitter 1602 comprises at least one of an antenna 452, a transmitter 454, a multi-antenna transmitting processor 457, a transmitting processor 468, a controller/processor 459, a memory 460 or a data source 467 in FIG. 4 of the present disclosure.

In Embodiment 16, the first receiver 1601 receives first control information; the first receiver 1601 chooses a target radio resource from a target resource pool; the first transmitter 1602 transmits a first radio signal in the target radio resource; the first control information is used for indicating a first radio resource group, and is also used for indicating a first priority; the first radio signal corresponds to a second priority; if the second priority is lower than the first priority, the target resource pool is orthogonal with the first radio resource group; if the second priority is higher the first priority, the target resource pool overlaps with the first radio resource group.

In one embodiment, the first transmitter 1602 transmits second control information; the second control information is used for indicating at least one of the target radio resource or a transmission format of the first radio signal.

In one embodiment, the first receiver 1601 receives third control information; the third control information is used for indicating a second radio resource group, the third control information comprises a first reference priority; the first reference priority is used for determining a first threshold, the first threshold is used for determining whether the second radio resource group can be occupied; the second radio resource group comprises the first radio resource group.

In one embodiment, the first receiver 1601 monitors the first control information; the first control information comprises a first identifier, the first identifier is used for determining a positive integer number of target receiver(s) of the first control information.

In one embodiment, the first transmitter 1602 transmits fourth control information; the second priority is higher than the first priority, the target radio resource belongs to the first radio resource group, the fourth control information indicates at least one of the second priority or the target radio resource.

In one embodiment, the first receiver 1601 detects Q first-type signal(s) in a first time window, the Q is a positive integer; a result of detection on the Q first-type signal(s) is used for determining the target resource pool; the target radio resource is determined autonomously from the target resource pool; a deadline of the first time window is no later than a start time of the target radio resource in time domain.

In one embodiment, the first receiver 1601 receives fifth control information; the fifth control information is used for indicating the target radio resource.

In one embodiment, the first receiver 1601 receives first configuration information; the first configuration information is used for determining the first candidate resource pool, the first candidate resource pool comprises the first radio resource group and the target resource pool, the first candidate resource pool comprises the first time window in time domain.

In one embodiment, the first node is a UE.
In one embodiment, the first node is a relay node.

Embodiment 17

Figure 17:
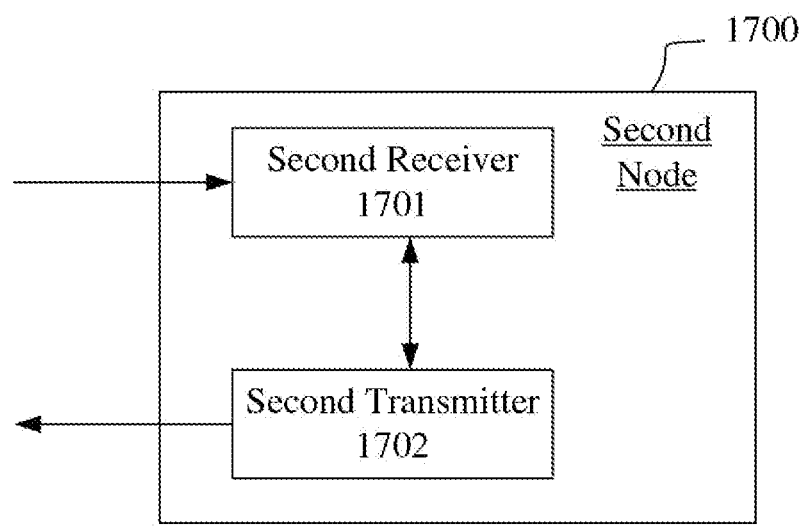
FIG. 17 illustrates a structure block diagram of a processing device in a second node according to one embodiment of the present disclosure.

Embodiment 17 illustrates a structure block diagram of a processing device in a second node, as shown in FIG. 17. In FIG. 17, a second node processing device 1700 mainly consists of a second receiver 1701 and a second transmitter 1702.

In one embodiment, the second receiver 1701 comprises at least one of an antenna 420, a transmitter/receiver 418, a multi-antenna receiving processor 472, a receiving processor 470, a controller/processor 475 or a memory 476 in FIG. 4 of the present disclosure.

In one embodiment, the second transmitter 1702 comprises at least one of an antenna 420, a transmitter/receiver 418, a multi-antenna transmitting processor 471, a transmitting processor 416, a controller/processor 475 or a memory 476 in FIG. 4 of the present disclosure.

In Embodiment 17, the second transmitter 1702 transmits first control information; the second receiver 1701 receives a first radio signal in a target radio resource; the first control information is used for indicating a first radio resource group and is also used for indicating a first priority; the target radio resource belongs to a target resource pool; the first radio signal corresponds to a second priority; if the second priority is lower than the first priority, the target resource pool is orthogonal with the first radio resource group; if the second priority is higher than the first priority, the target resource pool overlaps with the first radio resource group.

In one embodiment, the second receiver 1701 receives second control information; the second control information is used for indicating at least one of the target radio resource or a transmission format of the first radio signal.

In one embodiment, the second transmitter 1702 transmits third control information; the third control information is used for indicating a second radio resource group, the third control information comprises a first reference priority; the first reference priority is used for determining a first threshold, the first threshold is used for determining whether the second radio resource group can be occupied; the second radio resource group comprises the first radio resource group.

In one embodiment, the first control information comprises a first identifier, the first identifier is used for determining a positive integer number of target receiver(s) of the first control information.

In one embodiment, the second receiver 1701 receives fourth control information; the second priority is higher than the first priority, the target radio resource belongs to the first radio resource group, the fourth control information indicates at least one of the second priority or the target radio resource.

In one embodiment, the second receiver 1701 monitors the fourth control information; if the fourth control information is not detected, a third radio signal is transmitted in the first radio resource group.

In one embodiment, the second receiver 1701 monitors the fourth control information; if the fourth control information is detected, a third radio signal is not transmitted in the target radio resource, the target radio resource belongs to the first radio resource group.

In one embodiment, the second receiver 1701 receives second configuration information; the second configuration information is used for determining the first candidate resource pool, the first candidate resource pool comprises the first radio resource group and the target resource pool, the first candidate resource pool comprises the first time window in time domain.

In one embodiment, the second node is a base station.
In one embodiment, the second node is a relay node.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or a plurality of integrated circuits. Correspondingly, each module unit in the above embodiment may be implemented in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communication, comprising:
   receiving first control information, the first control information being used for indicating a first radio resource group, and the first control information being used for indicating a first priority;
   choosing a target radio resource from a target resource pool; and
   transmitting a first radio signal in the target radio resource;
   wherein the first radio signal corresponds to a second priority; if the second priority is lower than the first priority, the target resource pool is orthogonal with the first radio resource group; if the second priority is higher than the first priority, the target resource pool overlaps with the first radio resource group.

2. The method according to claim 1, comprising:
   transmitting second control information;
   wherein the second control information is used for indicating at least one of the target radio resource or a transmission format of the first radio signal;
   or, transmitting fourth control information;
   wherein the second priority is higher than the first priority, the target radio resource belongs to the first radio resource group, the fourth control information indicates at least one of the second priority or the target radio resource;
   or, detecting Q first-type signal(s) in a first time window, Q is a positive integer;
   wherein a result of detection on the Q first-type signal(s) is used for determining the target resource pool; the target radio resource is determined autonomously from the target resource pool; a deadline of the first time window is no later than a start time of the target radio resource in time domain;
   or, receiving fifth control information;
   wherein the fifth control information is used for indicating the target radio resource.

3. The method according to claim 1, comprising:
   receiving third control information;
   wherein the third control information is used for indicating a second radio resource group, the third control information comprises a first reference priority; the first reference priority is used for determining a first threshold, the first threshold is used for determining whether the second radio resource group can be occupied; the second radio resource group comprises the first radio resource group.

4. The method according to claim 1, comprising:
   monitoring the first control information;
   wherein the first control information comprises a first identifier, the first identifier is used for determining a positive integer number of target receiver(s) of the first control information.

5. The method according to claim 1, comprising:
   receiving first configuration information;
   wherein the first configuration information is used for determining a first candidate resource pool, the first candidate resource pool comprises the first radio resource group and the target resource pool, the first candidate resource pool comprises the first time window in time domain.

6. A method in a second node for wireless communication, comprising:
   transmitting first control information, the first control information being used for indicating a first radio resource group, and the first control information being used for indicating a first priority; and
   receiving a first radio signal in a target radio resource;
   wherein the target radio resource belongs to a target resource pool; the first radio signal corresponds to a second priority; if the second priority is lower than the first priority, the target resource pool is orthogonal with the first radio resource group; if the second priority is higher than the first priority, the target resource pool overlaps with the first radio resource group.

7. The method according to claim 6, comprising:
   receiving second control information;
   wherein the second control information is used for indicating at least one of the target radio resource or a transmission format of the first radio signal;
   or, receiving fourth control information;
   wherein the second priority is higher than the first priority, the target radio resource belongs to the first radio resource group, the fourth control information indicates at least one of the second priority or the target radio resource;
   or, the first control information comprises a first identifier, the first identifier is used for determining a positive integer number of target receiver(s) of the first control information.

8. The method according to claim 6, comprising:
   transmitting third control information;
   wherein the third control information is used for indicating a second radio resource group, the third control information comprises a first reference priority; the first reference priority is used for determining a first threshold, the first threshold is used for determining whether the second radio resource group can be occupied; the second radio resource group comprises the first radio resource group.

9. The method according to claim 6, comprising:
   monitoring the fourth control information;
   if the fourth control information is not detected, transmitting a third radio signal in the first radio resource group;
   or, if the fourth control information is detected, not transmitting a third radio signal in the target radio resource, the target radio resource belonging to the first radio resource group.

10. The method according to claim 6, comprising:
    receiving second configuration information;
    wherein the second configuration information is used for determining the first candidate resource pool, the first candidate resource pool comprises the first radio resource group and the target resource pool, the first candidate resource pool comprises the first time window in time domain.

11. A first node for wireless communication, comprising:
a first receiver, receiving first control information;
wherein the first receiver chooses a target radio resource from a target resource pool;
and a first transmitter, transmitting a first radio signal in the target radio resource;
wherein the first control information is used for indicating a first radio resource group, the first control information is used for indicating a first priority; the first radio signal corresponds to a second priority; if the second priority is lower than the first priority, the target resource pool is orthogonal with the first radio resource group; if the second priority is higher than the first priority, the target resource pool overlaps with the first radio resource group.

12. The first node according to claim 11, wherein
the first transmitter transmits second control information;
wherein the second control information is used for indicating at least one of the target radio resource or a transmission format of the first radio signal;
or, the first transmitter transmits fourth control information;
wherein the second priority is higher than the first priority, the target radio resource belongs to the first radio resource group, the fourth control information indicates at least one of the second priority or the target radio resource;
or, the first receiver detects Q first-type signal(s) in a first time window, Q is a positive integer;
wherein a result of detection on the Q first-type signal(s) is used for determining the target resource pool; the target radio resource is determined autonomously from the target resource pool; a deadline of the first time window is no later than a start time of the target radio resource in time domain;
or, the first receiver receives fifth control information;
wherein the fifth control information is used for indicating the target radio resource.

13. The first node according to claim 11, wherein
the first receiver receives third control information;
wherein the third control information is used for indicating a second radio resource group, the third control information comprises a first reference priority; the first reference priority is used for determining a first threshold, the first threshold is used for determining whether the second radio resource group can be occupied; the second radio resource group comprises the first radio resource group.

14. The first node according to claim 11, wherein
the first receiver monitors the first control information;
wherein the first control information comprises a first identifier, the first identifier is used for determining a positive integer number of target receiver(s) of the first control information.

15. The first node according to claim 11, wherein
the first receiver receives first configuration information;
wherein the first configuration is used for determining the first candidate resource pool, the first candidate resource pool comprises the first radio resource group and the target resource pool, the first candidate resource pool comprises the first time window in time domain.

16. A second node for wireless communication, comprising:
a second transmitter, transmitting first control information,
and a second receiver, receiving a first radio signal in a target radio resource;
wherein the first control information is used for indicating a first radio resource group, the first control information is used for determining a first priority; the target radio resource belongs to a target resource pool; the first radio signal corresponds to a second priority; if the second priority is lower than the first priority, the target resource pool is orthogonal with the first radio resource group; if the second priority is higher than the first priority, the target resource pool overlaps with the first radio resource group.

17. The second node according to claim 16, wherein
the second receiver receives second control information;
wherein the second control information is used for indicating at least one of the target radio resource or a transmission format of the first radio signal;
or, the second receiver receives fourth control information;
wherein the second priority is higher than the first priority, the target radio resource belongs to the first radio resource group, the fourth control information indicates at least one of the second priority or the target radio resource;
or, the first control information comprises a first identifier, the first identifier is used for determining a positive integer number of target receiver(s) of the first control information.

18. The second node according to claim 16, wherein
the second transmitter transmits third control information;
wherein the third control information is used for indicating a second radio resource group, the third control information comprises a first reference priority; the first reference priority is used for determining a first threshold, the first threshold is used for determining whether the second radio resource group can be occupied; the second radio resource group comprises the first radio resource group.

19. The second node according to claim 16, comprising:
the second receiver, monitoring the fourth control information;
if the fourth control information is not detected, transmitting a third radio signal in the first radio resource group;
or, if the fourth control information is detected, not transmitting a third radio signal in the target radio resource, the target radio resource belongs to the first radio resource group.

20. The second node according to claim 16, comprising:
the second receiver, receiving second configuration information;
wherein the second configuration information is used for determining the first candidate resource pool, the first candidate resource pool comprises the first radio resource group and the target resource pool, the first candidate resource pool comprises the first time window in time domain.

* * * * *